US009671569B2

(12) United States Patent
Kempeneers et al.

(10) Patent No.: US 9,671,569 B2
(45) Date of Patent: Jun. 6, 2017

(54) CABLE SEALING DEVICE, CABLE TERMINATION AND ATTACHING DEVICE

(71) Applicant: TYCO ELECTRONICS RAYCHEM BVBA, Kessel-Lo (BE)

(72) Inventors: Dirk Kempeneers, Aarschot (BE); Bart Vos, Geel (BE); Kristof Vastmans, Boutersem (BE); Danny Willy August Verheyden, Gelrode (BE); Jos Paul G. Vandepoel, Halen (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 14/543,181

(22) Filed: Nov. 17, 2014

(65) Prior Publication Data
US 2015/0168656 A1 Jun. 18, 2015

Related U.S. Application Data

(63) Continuation of application No. 13/575,899, filed as application No. PCT/EP2011/050606 on Jan. 18, 2011, now Pat. No. 8,917,967.

(30) Foreign Application Priority Data

Jan. 29, 2010 (EP) .................................... 10000930

(51) Int. Cl.
*G02B 6/44* (2006.01)
*G02B 6/38* (2006.01)
(Continued)

(52) U.S. Cl.
CPC ......... *G02B 6/3887* (2013.01); *G02B 6/3894* (2013.01); *G02B 6/4471* (2013.01);
(Continued)

(58) Field of Classification Search
CPC ... G02B 6/3887; G02B 6/4465; H02G 15/013
See application file for complete search history.

(56) References Cited

U.S. PATENT DOCUMENTS 4,295,005 A 10/1981 Daugherty et al.
5,598,500 A 1/1997 Crespel et al.
(Continued)

FOREIGN PATENT DOCUMENTS

DE 10 2006 033186 1/2008
EP 1 775 610 A2 4/2007
(Continued)

OTHER PUBLICATIONS

European Search Report for EP No. 10 00 0925 mailed Jul. 7, 2010.
(Continued)

*Primary Examiner* — Omar R Rojas
(74) *Attorney, Agent, or Firm* — Merchant & Gould P.C.

(57) ABSTRACT

A cable sealing device including an attaching part securable to the cable; a fixation part adapted to be mountable on the attaching part; and a sealing part. The attaching part includes outer locking faces. The fixation part has inner abutment faces adapted to co-operate with the outer locking faces to axially and rotationally lock the fixation part relative to the attaching part. The sealing part includes an inner seal and an outer seal. The sealing part also includes a second securing arrangement that is configured to engage a first securing arrangement of the fixation part to axially and rotationally lock the sealing part to the fixation part.

24 Claims, 17 Drawing Sheets

(51) Int. Cl.
*H02G 3/22* (2006.01)
*H02G 15/007* (2006.01)
*H02G 15/013* (2006.01)
*H01R 13/516* (2006.01)
*H01R 13/52* (2006.01)

(52) U.S. Cl.
CPC ....... *H01R 13/516* (2013.01); *H01R 13/5202* (2013.01); *H02G 3/22* (2013.01); *H02G 15/007* (2013.01); *H02G 15/013* (2013.01); *G02B 6/4465* (2013.01)

(56) References Cited

U.S. PATENT DOCUMENTS

| | | | |
|---|---|---|---|
| 6,542,674 | B1 | 4/2003 | Gimblet |
| 6,546,175 | B1 | 4/2003 | Wagman et al. |
| 6,579,014 | B2 | 6/2003 | Melton et al. |
| 6,648,520 | B2 | 11/2003 | McDonald et al. |
| 6,714,710 | B2 | 3/2004 | Gimblet |
| 6,785,450 | B2 | 8/2004 | Wagman et al. |
| 6,899,467 | B2 | 5/2005 | McDonald et al. |
| 6,962,445 | B2 | 11/2005 | Zimmel et al. |
| 7,090,406 | B2 | 8/2006 | Melton et al. |
| 7,090,407 | B2 | 8/2006 | Melton et al. |
| 7,111,990 | B2 | 9/2006 | Melton et al. |
| 7,113,679 | B2 | 9/2006 | Melton et al. |
| 7,146,090 | B2 | 12/2006 | Vo et al. |
| 7,264,402 | B2 | 9/2007 | Theuerkorn et al. |
| 7,338,214 | B1 | 3/2008 | Gurreri et al. |
| 7,467,896 | B2 | 12/2008 | Melton et al. |
| 7,556,437 | B2 | 7/2009 | Droege |
| 7,572,065 | B2 | 8/2009 | Lu et al. |
| 7,744,286 | B2 | 6/2010 | Lu et al. |
| 7,744,288 | B2 | 6/2010 | Lu et al. |
| 7,762,726 | B2 | 7/2010 | Lu et al. |
| 7,785,015 | B2 | 8/2010 | Melton et al. |
| 7,881,576 | B2 | 2/2011 | Melton et al. |
| 7,918,609 | B2 | 4/2011 | Melton et al. |
| 7,942,587 | B2 | 5/2011 | Barnes et al. |
| 7,942,590 | B2 * | 5/2011 | Lu ....................... G02B 6/3816 385/78 |
| 7,959,361 | B2 | 6/2011 | Lu et al. |
| 8,128,294 | B2 | 3/2012 | Lu et al. |
| 8,202,008 | B2 | 6/2012 | Lu et al. |
| 8,414,196 | B2 | 4/2013 | Lu et al. |
| 8,465,212 | B2 | 6/2013 | Bradley |
| 8,556,520 | B2 | 10/2013 | Elenbaas et al. |
| 2008/0317415 | A1 | 12/2008 | Hendrickson et al. |
| 2009/0087147 | A1 | 4/2009 | Barnes et al. |
| 2009/0162016 | A1 | 6/2009 | Lu et al. |
| 2010/0322563 | A1 | 12/2010 | Melton et al. |
| 2012/0298417 | A1 | 11/2012 | Kempeneers et al. |

FOREIGN PATENT DOCUMENTS

| | | |
|---|---|---|
| FR | 2 758 017 | 7/1998 |
| GB | 2 030 011 A | 3/1980 |
| WO | WO 95/34929 A1 | 12/1995 |
| WO | WO 2007/014385 A2 | 2/2007 |
| WO | WO 2007/039585 A1 | 4/2007 |
| WO | WO 2008/085692 | 7/2008 |
| WO | WO 2009/100796 | 8/2009 |
| WO | WO 2009/111176 | 9/2009 |

OTHER PUBLICATIONS

International Search Report for International Application No. PCT/EP2011/050615 mailed May 30, 2012.
Office Action from U.S. Appl. No. 13/575,888 mailed Nov. 12, 2013.
International Search Report for International Application No. PCT/EP2011/050606 mailed May 30, 2012.
European Search Report for EP No. 10 00 0930 mailed Jul. 7, 2010.
European Search Report Dated Jul. 21, 2010 for Application No. 10000926.5 -1242, 8 pages.

* cited by examiner

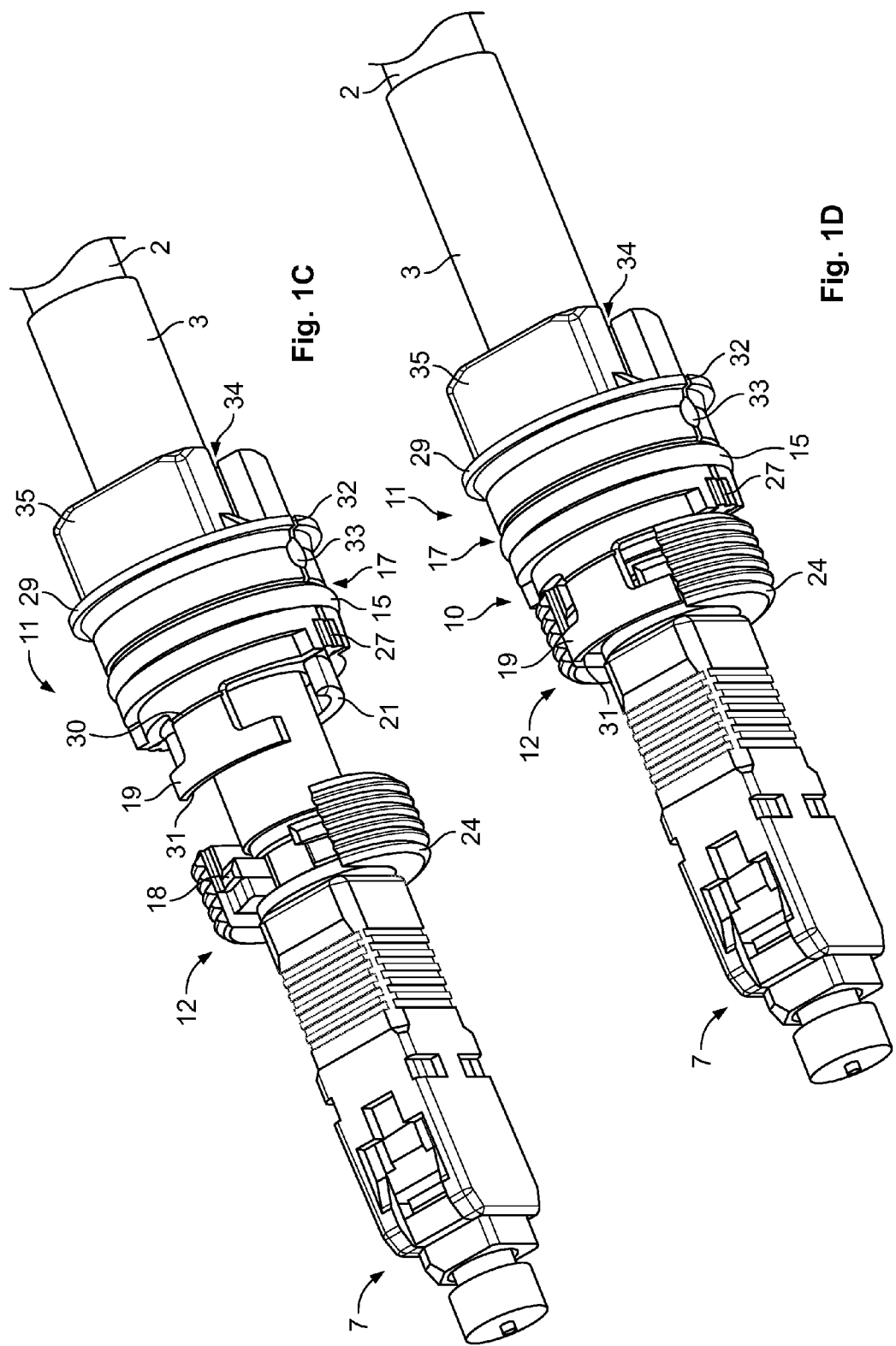

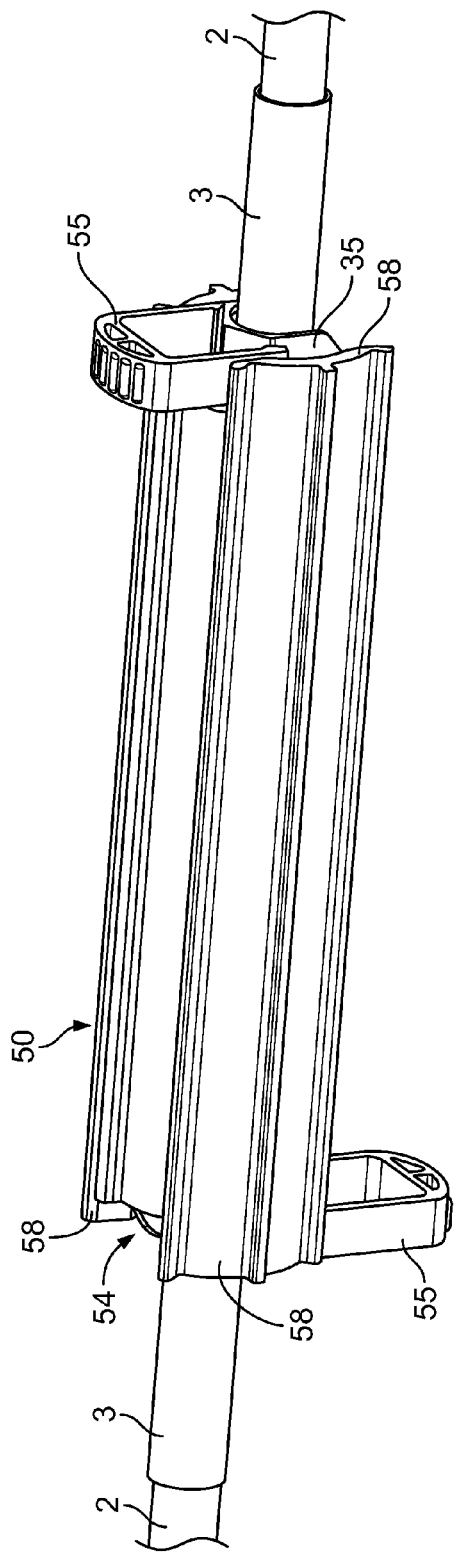
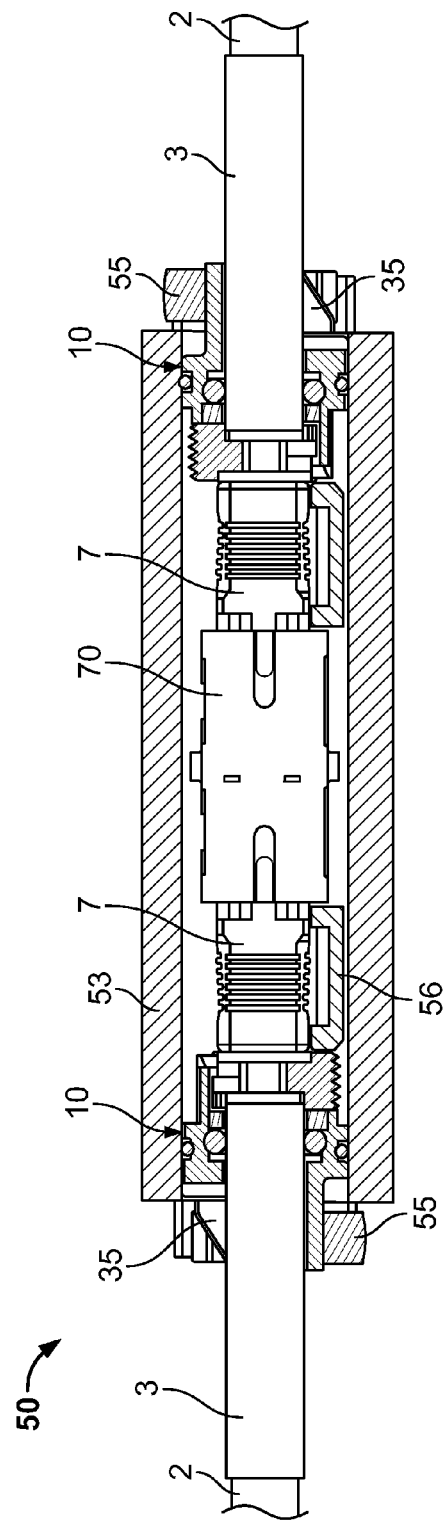
Fig. 5E
Fig. 6

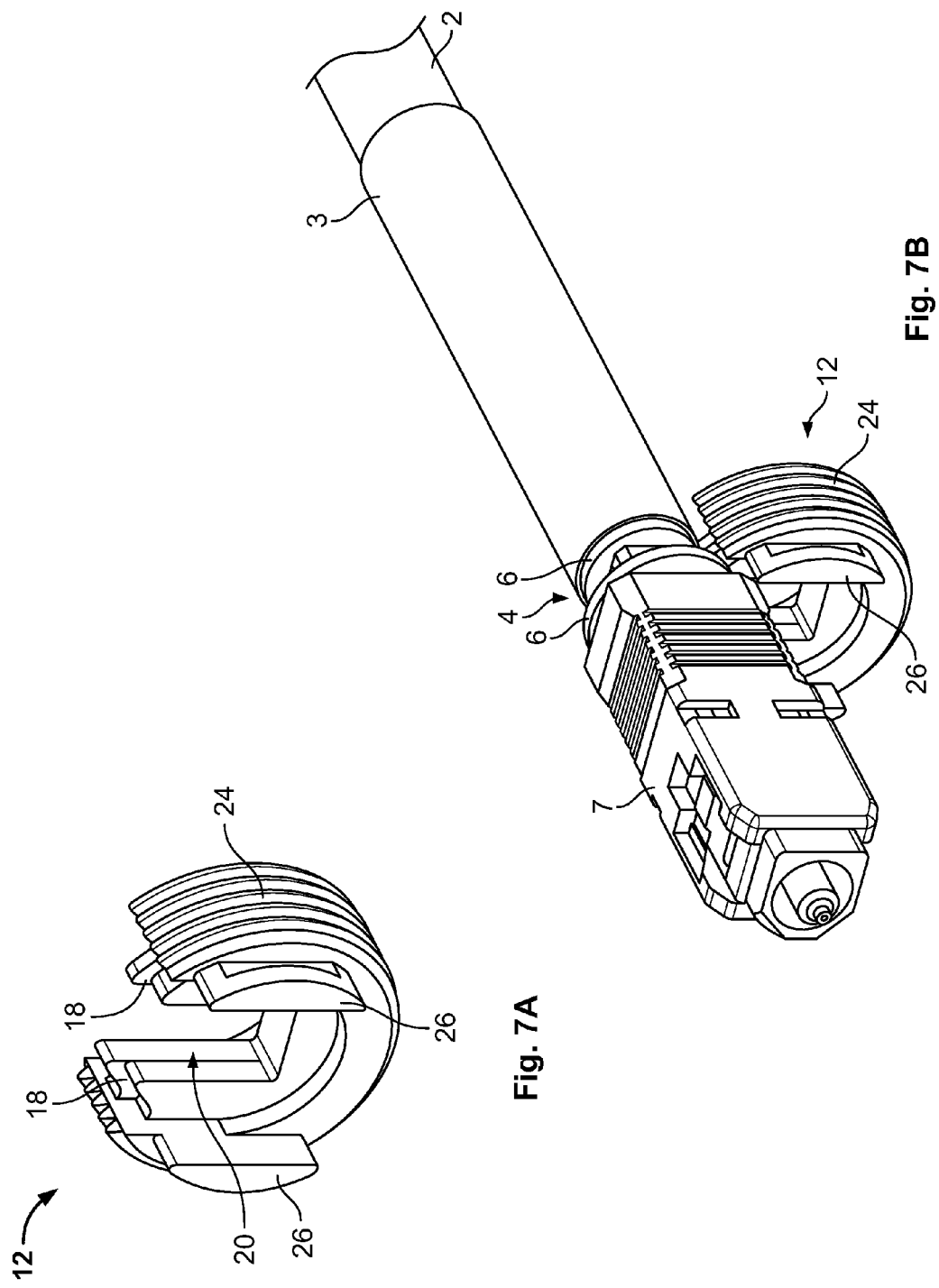

CABLE SEALING DEVICE, CABLE TERMINATION AND ATTACHING DEVICE

This application is a Continuation of U.S. Ser. No. 13/575,899, filed 27 Jul. 2012, now U.S. Pat. No. 8,917,967, which is a National Stage Application of PCT/EP2011/050606, filed 18 Jan. 2011, which claims benefit of Serial No. 10000930.7, filed 29 Jan. 2010 in Europe and which applications are incorporated herein by reference. To the extent appropriate, a claim of priority is made to each of the above disclosed applications.

BACKGROUND

The present invention relates to a cable sealing device for sealing a passage of a cable, to a cable termination provided with the cable sealing device and to an attaching device securable to a cable for supporting an installing of the cable sealing device on the cable.

A cable sealing device is e.g. known from WO 2007/014385 A2, which finds particular application in the field of telecommunication technology to which the present invention preferably relates.

The known cable sealing device provides a sealing part having a passageway through which a cable is guidable, wherein said passageway accommodates an inner seal for sealing the passage of the cable. The sealing part further comprises an outer thread engagement for cooperating with an internal thread engagement provided in an opening formed in a cable sealing and retaining device to which the cable sealing device is securable. This engagement provides an outer seal for the sealing part. The cable sealing device has a fixation part formed by a grip means received in the passageway of the sealing part. Particularly, the grip means abuts against an inner longitudinal surface provided with the sealing part to retain the sealing part in longitudinal, i.e. in axial direction thereof. The grip means has an aperture through which the cable axially extends, wherein the aperture has such a size that the grip means is allowed to grip and, thereby, to be retained on the cable. The grip means is sandwiched in the passageway by the axial inner surface of the sealing part and the inner seal. The cable sealing device has a washer arranged on the other side of the inner seal to prevent wear or damage of the inner seal by a bolt portion screwed into the passageway and compressing the inner seal to be radially deformed, thereby achieving the sealing performance. The cable sealing device is substantially secured to the cable by the pressing force exerted by the grip means and further optionally by the inner seal in its compressed state on the cable.

The cable sealing device cannot reliably prevent, for instance, in an assembled state to a mounting like a cable sealing and retaining device, a twist and/or an axial displacement between the cable and the cable sealing device when a force, e.g. a pulling force acting on the cable in its longitudinal direction is larger than the retaining force of the grip means. Thus, by the axial displacement of the cable with respect to the cable sealing, a damage of the outer cable jacket can arise due to possible sharp-edged parts of the grip means press-fitted on the cable, wherein, for instance, an optical fibre element guided by the cable is also subjected to the risk of being damaged.

Moreover, in case of securing the cable sealing device to a commonly known cable having an attaching part connectable to a connector and providing strain relief as e.g. described in WO 2007/039585 A1, the cable sealing device can only be mounted on the cable adjacent to the attaching part, wherein, in a mounted state of the cable sealing device to the cable sealing and retaining device, at least the attaching part projecting from a longitudinal end side of the cable jacket extends into an accommodating space provided inside the cable sealing and retaining device, thereby reducing the accommodating space required for performing operations on said cable or for accommodating one or more connectors connected to the attaching part of one or more connectorizable cables, respectively. Further, an assembling of the cable sealing device on the cable is complicated due to the plurality of parts, their small shape and the respective effort required for mounting the grip means and the remaining parts on the cable.

SUMMARY

It is an object of the present invention to provide an improved cable sealing device simply mountable on a cable providing an attaching part and reliably securable on the cable in its circumferential and longitudinal directions.

The above object is solved by a cable sealing device. The inventive cable sealing device is based on a principle that, for securing the cable sealing device to a cable having a commonly known attaching part, formations, particularly faces already provided with the attaching part are employed as a mounting area for the cable sealing device. Specifically, the faces are used for forming a positive locking between the attaching part and the cable sealing device. Furthermore, the cable on which the inventive cable sealing device is mountable, can be formed of a coax cable, a copper cable, an optical fibre cable and the like, in general a cable used preferably in telecommunications technology and providing an attaching part with formations usable as positive locking faces.

Particularly, the inventive cable sealing device comprises a sealing part providing a passageway with an inner seal through which the cable is sealingly guidable, and an outer seal arranged on an outer circumference of the sealing part. The inner seal seals the passage of the cable through the sealing part, and the outer seal is provided for sealing an area between an outer circumference of the cable sealing device and a mounting such as a cable sealing and retaining device to which the cable sealing device is preferably attachable. The body of the sealing part, which provides the passageway and which supports the inner seal and the outer seal, is preferably formed by injection moulding of a plastic material. More preferably, the body is formed of a single element. Alternatively, the body of the sealing part may be preferably formed of two elements connectable to each other from a radial outer side of the sealing part with respect to its passageway running in parallel with the longitudinal axis of the sealing part. Said two elements may be preferably secured to each other at least by the outer seal preferably formed of a commonly known sealing material as rubber, gel and the like and further preferably having an O-ring shape with an inner diameter smaller than an outer diameter of the sealing part to apply a pressing force to a radial inner side of the outer seal in its mounted state on the sealing part. Alternatively or in addition thereto, the two elements forming the body may be preferably provided with positive locking means providing a positive locking in longitudinal direction of the sealing part and in a direction transverse thereto. Thereby, the sealing part is radially mountable on the cable.

Moreover, the cable sealing device comprises a fixation part adapted to be mountable on the attaching part, which is securable to the cable and which provides accessible outer positive locking faces extending in circumferential and longitudinal direction of the cable, wherein the fixation part provides inner circumferential and axial abutment faces adapted to co-operate with the outer positive locking faces so as to provide therebetween a positive locking in circumferential and longitudinal direction. In general, an axial direction relates to a direction running in parallel with the extension direction of the passageway formed by the sealing part, wherein said direction runs also in parallel to the longitudinal direction of the cable guidable by the sealing part. The circumferential direction relates to a direction running around the longitudinal direction. The positive locking face and the abutment surface refers to a surface shape capable of compensating pressing forces caused for instance by abutment under a pressing force of two correspondingly shaped surfaces. The positive locking face and the abutment surface, respectively, may be preferably formed of a flat surface, a concave surface or a convex surface, wherein each of said surface shapes may co-operate with similar or different surface shapes as long as a positive locking can be obtained therebetween in at least longitudinal or circumferential direction. For instance, the positive locking face and the associated abutment surface may be formed of a flat surface. Alternatively, the positive locking face may be formed of a convex surface, wherein the corresponding abutment surface may have a concave shape. Further alternatively, the positive locking face may be formed of a concave surface, wherein the corresponding abutment surface may have a convex shape. Further corresponding surface shapes are feasible as long as said corresponding surfaces provide a positive locking in at least one direction. Accordingly, the positive locking between the fixation part and the attaching part in longitudinal direction is achieved by at least two surfaces adapted to abut against each other in longitudinal direction, one surface is provided with the fixation part and the other surface is formed with the attaching part. Moreover, the positive locking acting therebetween in circumferential direction is obtained by at least two additional surfaces adapted to abut against each other in circumferential direction, wherein the one additional surface is provided with the fixation part and the other additional surface is formed with the attaching part.

For exemplary explaining a structure of an attaching part providing positive locking faces to which the fixation part is preferably mountable, a shape of a commonly known attaching part as described in WO 2007/039585 A1 is used. Particularly, the attaching part has a middle section of a polygonal cross-sectional shape providing a plurality of flat surfaces at an outer circumference of the attaching part, wherein said flat surfaces are sandwiched in longitudinal direction of the attaching part by flanges protruding said flat surfaces transverse to said longitudinal direction, i.e in radial direction. In general, an attaching part commonly known in the technical field of telecommunications technology has in a majority of cases a section providing a circumferential groove or a plurality of grooves arranged successively with a distance therebetween in circumferential direction of the attaching part. The bottom of the groove section may then form the positive locking face for providing a positive locking in circumferential direction of the attaching part by means of abutment there against, wherein the wall sections defining the groove in longitudinal direction thereof may form the positive locking faces providing a positive locking in longitudinal direction by abutting there against. As described above, the surfaces may preferably have another shape than a flat shape. Alternatively or in addition thereto, the attaching part may be preferably provided with at least one pin-like protrusion projecting from an outer circumference or with at least one pin-like receiving hole formed in the outer circumference, wherein the fixation part may be provided with an associated pin-like receiving hole or a pin-like protrusion, accordingly.

Additionally, the fixation part has first securing means for cooperating with second securing means provided with the sealing part to secure the sealing part in circumferential and longitudinal direction against the fixation part. Preferably, the sealing part is releasably securable against the fixation part. Moreover, the fixation part is preferably formed by injection moulding of a plastic material as the sealing part. More preferably, the fixation part is formed of a single element. Alternatively, the fixation part may be preferably formed of two parts connectable to each other from a radial direction and securable preferably by latching means or other engagement means capable of securing two parts to each other.

Due to the above configuration of the cable sealing device, the parts provided for the cable sealing device can be simply shaped, preferably with a simply handleable size in view of the parts provided with the known cable sealing device to be securable together in a simple way. Furthermore, the cable sealing device can be reliably secured to the cable in circumferential and longitudinal direction thereof without the risk of loosening the original secured position on the cable, thereby preventing a possible damage of the cable and a signal transmitting element guidable therein.

Preferred embodiments of the inventive cable sealing device are subject to the dependent claims.

In one preferred embodiment, the fixation part provides additional positive locking means on an outer circumference and/or on a longitudinal end section freely accessible from a radial outer side. Particularly, the fixation part may be preferably arranged directly adjacent to the sealing part in the assembled state thereof and, further preferable, abuts against the sealing part in longitudinal direction, wherein the fixation part provides at least one freely accessible longitudinal end section on a side on which the sealing part is not arranged. Alternatively or in addition thereto, the fixation part may preferably provide a freely accessible longitudinal end section on the side at which the sealing part is arranged. Specifically, a gap portion may be preferably provided between the fixation part and the sealing part in circumferential direction thereof, wherein said gap portion may be formed of a ring segment partially extending in circumferential direction or may be formed continuously in circumferential direction. Alternatively or in addition thereto, the fixation part may provide a portion with an outer diameter larger than an outer diameter of an adjacent portion of the sealing part. In other words, the fixation part may provide a portion projecting in radial direction from an outer circumference of said adjacent portion of the sealing part when viewed in longitudinal direction thereof. For those cases, the longitudinal end sections are freely accessible from the radial outer side of the fixation part and may be used for co-operating with means of a mounting to which the cable sealing device is mountable to secure the fixation part to the mounting at least in longitudinal direction of the cable.

Further preferable, the additional positive locking means on the outer circumference of the fixation part is formed of a thread engagement or a bayonet fitting, which allow fast and reliable securing of the cable sealing device to and releasing from the associated mounting. Furthermore, in the secured state of the cable sealing device against the mounting, the fixation provides tension relief in longitudinal direction of the cable. The tension relief may be preferably influenced for the thread engagement by the number of windings selected therefor. Accordingly, the higher the number of windings, the higher the tension relief performance.

Moreover, the bayonet fitting may be preferably a commonly known one with a male side with one or more pins and a female receptor with matching L-slots and one or more springs to keep the bayonet fitting secured together. Particularly, the fixation part provides the pin or the female receptor, wherein the mounting to which the cable sealing device may be secured has the associated female receptor or pin, respectively. The fixation part is securable to the mounting in a known manner by aligning the pin and the slot and pushing them together. Once the pins reach the bottom of the slot, the fixation part is rotated or the fixation part and the mounting are rotated with respect to each other in opposite directions to guide the pin across the bottom of the slot. The spring then holds the pin in position to prevent it from backing out. To disconnect, the fixation part and the mounting are pushed together to overcome the spring whilst twisting slightly to reverse the securing turn.

Preferably, the sealing part provides a flange portion, preferably a circumferential flange portion between the outer seal and the rear end side of the sealing part, wherein said flange portion forms the radial outer part of the sealing part and provides a longitudinal abutment surface for abutting against a mounting in a secured state of the cable sealing device. In other words, the cable sealing device can be adapted to be secured to the mounting by means of the thread engagement or the bayonet fitting so as to tightly abutting the flange portion against the mounting. Further preferably, an additional seal can be provided between the outer seal and the flange portion for sealing the abutment of the flange portion against the mounting and for further improving the sealing performance of the cable sealing device.

Hence, the cable sealing device may be secured to the cable and to the mounting only by means of the fixation part. Thereby, a securing of the cable sealing device guiding the cable against the mounting may be conductable in a dissembled state or assembled state of the cable sealing device, wherein the dissembled state refers to a state in which the sealing part is released from the fixation part, and wherein the assembled state is a state in which the fixation part and the sealing part are secured to each other. Thus, a degree of freedom concerning possible handlings of the cable sealing device, particularly of each part thereof is increased. For instance, the sealing part may be further handleable while the fixation part is already secured against the mounting.

Further, as the attaching part forms part of the mounting area for the cable sealing device, an accommodating space of a cable sealing and retaining device, to which the cable sealing device is securable, can be saved, since the attaching part will not further project into said space in the secured state of the cable sealing device against the cable sealing and retaining device. Thus, further space for performing operations on the cable inside the cable sealing and retaining device can be provided.

In addition, the features of the cable sealing device, i.e. the securing feature and the sealing feature may be clearly related to a single part of the cable sealing device. Particularly, the fixation part may be preferably used only for the securing feature, that is for securing the cable sealing device to the cable and for securing the cable sealing device to the cable sealing and retaining device. Whereas the sealing part may be preferably provided merely for the sealing feature by sealing the passage of the cable and by sealing the securing of the cable sealing device against the cable sealing and retaining device. Hence, in case one of the features is considered defective, that is in case one of the fixation part and the sealing part is damaged, only the damaged part needs to be replaced.

According to a further preferred embodiment, the additional positive locking means at the longitudinal free end section of the fixation part may be preferably formed of a protrusion longitudinally projecting from the longitudinal end section and providing a groove section extending in circumferential direction of the fixation part and forming abutment faces in longitudinal direction of the fixation part accessible from the radial outer side. The groove section may be preferably straight formed in circumferential direction or convex shaped forming a curvature in radial outer direction. The groove section may preferably provide a slot with an end in circumferential direction to restrict an insertion depth along said circumferential direction of an associated part insertable therein. Alternatively, the groove section may preferably form a slit with open ends in circumferential direction. More preferably, at least two protrusions are formed at the longitudinal free end section at opposing sides with respect to the radial direction of the fixation part.

The additional positive locking means at the longitudinal free end section may preferably co-operate with a further part insertable into the groove section so as to provide a positive locking in longitudinal direction of the fixation part. According thereto, tension relief in longitudinal direction of the cable may be obtained by connection of the associated part thereto, specifically when the additional positive locking means on the outer circumference are not provided or not used.

According to a preferred alternative embodiment, the positive locking means at the longitudinal free end side may be preferably provided with the attaching part having preferably a configuration as described above. Particularly, in a secured state of the cable sealing device on the cable, a longitudinal end surface side of the attaching part at a front side of the fixation part is exposed at least in longitudinal direction and comprises positive locking means having a configuration as described above, wherein said positive locking means project from the longitudinal free end side of the attaching part in longitudinal direction and are preferably arranged at a radial end section of the attaching part. Further preferable, the attaching part comprises at least two positive locking means at opposing radial sides on the longitudinal free end side of the attaching part, wherein the attaching part additionally has at a radial inner side between the positive locking means a connection portion for securing a connector thereto. Thus, the connector secured to the attaching part will be preferably disposed between the positive locking means and will extend in parallel thereto from said attaching part.

According to a further preferred embodiment, the fixation part is C-shaped to be radially mountable on the attaching part. Thereby, an assembling of the cable sealing device to the cable can be simplified as the fixation part does not need to be mounted from a longitudinal end side of the attaching part by moving the fixation part from said longitudinal end side on the positive locking faces. Therefore, the fixation part can be mounted on an attaching part providing a circumferential groove or a pin-like protrusion as described above. Thereby, the fixation part can be reliably secured in longitudinal direction of the attaching part.

Further preferable, the sealing part comprises a cavity for the inner seal, wherein the cavity is opened to a front side of the sealing part facing the fixation part and to a radial side facing the passageway. In other words, the cavity provides an abutment surface for the inner seal in radial outer side direction and a further abutment surface for the inner seal in a longitudinal direction pointing away from the fixation part. According thereto, the cavity receives the inner seal from the front side of the sealing part when assembling the body of the sealing part with the inner seal. Thus, the body of the sealing part and the inner seal may be separately mountable on and releasable from the cable. Hence, in case of damage of either the inner seal or the body of the sealing part, only the damaged element needs to be replaced.

In order to close the cavity in circumferential direction, a ring part is arranged between the C-shaped fixation part and the inner seal. Thereby, an additional circumferential extending abutment surface for the inner seal on the front side of the sealing part can be provided. The ring part may be preferably formed by injection moulding of a plastic material.

More preferably, the inner seal has an outer diameter larger than an inner diameter of the cavity. Accordingly, in the secured state of the cable sealing device on the cable, the inner seal may perform a pressure in radial direction onto the cable and against the sealing part, whereby the sealing material of the inner seal may be urged to flow in longitudinal direction. Said flow is prevented by the abutment surfaces provided in longitudinal direction by the cavity and the ring part, wherein the pressure of the inner seal in radial direction can be maintained. Hence, the sealing part may be securable on the cable additionally by the inner seal. Further, a sealing performance of the cable sealing device, i.e. the sealing between the inner seal and the cable and also the sealing between the inner seal and the sealing part can be further increased, since tolerances between the inner seal and the cable may be compensated. By simply varying the shape of the inner seal, that is, by providing a respective diameter for the inner seal, the sealing can be influenced appropriately. In comparison, the known cable sealing device provides a sealing performance depending on a compressive force acting in longitudinal direction on the inner seal, wherein said compressive force is obtained by screwing the bolt portion into the sealing part to press against the inner seal. However, said compressive may decrease when the bolt portion turns back in loosening direction due to vibration or other influences, wherein an insufficient sealing performance may be achieved.

Further preferable, the inner seal is wrap-around shaped and may be preferably formed of a sealing material such as gel, rubber, mastic and the like. Due to said wrap-around shape, the inner seal can be mounted from a radial outer side on the cable. Alternatively, the inner seal is preferably formed of an O-ring to be mounted on the cable from a longitudinal cable end side. In this context, the outer seal arranged on the outer circumference of the sealing part is preferably formed of a shape and material like the inner seal. Alternatively, the inner seal and the outer seal may preferably differ in shape, sealing material and number in case of need.

In a further preferred embodiment, the outer seal is received and supported by a circumferential groove formed on an outer circumference of the sealing part. The outer seal can be reliably retained in said groove by mounting the cable sealing device to a mounting.

According to a further preferred embodiment, the first securing means defines circumferentially an opening formed by the C-shape, wherein the second securing means has a hammer-head shape which projects the opening in circumferential direction to provide a positive locking between the fixation part and the sealing part in longitudinal direction of the cable. Due to the C-shape, the opening is formed at an outer circumference of the fixation part and extends in circumferential direction. The first securing means may preferably be placed at a position directly adjacent in circumferential direction to the opening or further preferable inside the opening, thereby forming a circumferential boundary for the opening. Further preferably, the first securing means borders the opening at both circumferential sides thereof. The first securing means may be preferably formed of a bar-shaped protrusion projecting in radial inner direction from an inner circumference of the C-shaped fixation part, wherein an end face of the bar-shaped protrusion directing radially toward an outside of the opening forms preferably with the outer circumference of the fixation part interrupted by the opening a common outer circumferential surface. Accordingly, the end face may denote a continuation of said outer circumference by forming the end face with a distance or radius with respect to the axis of the fixation part similar to a distance or radius of the outer circumference in regard of said axis. Alternatively, the end face is preferably formed with a smaller radius or has a smaller distance to said axis to be provided at a radial shorter distance than a circumferential edge forming part of the outer circumference of the fixation part.

The sealing part provides a longitudinal end surface from which the hammer-head shaped second securing means projects in longitudinal direction to form a longitudinal free end portion of the sealing part, wherein the head portion constitutes in longitudinal direction the front end portion of the sealing part which is connected to the longitudinal end surface via a neck portion. Preferably, the head portion projects the opening in circumferential direction. Further, the hammer-head shaped second securing means is preferably elastically movable in radial direction of the sealing part. More preferable, the second securing means comprises on its radial outer surface an incision extending in circumferential direction and being arranged in a surface plane of the longitudinal end surface of the sealing part. In other words, the incision providing a material portion with a smaller thickness is arranged at the longitudinal end side of the neck portion connected to the sealing part. Thereby, the second securing means may be slidable over the first securing means to engage the first securing means from a front side of the fixation part, which is the side facing away from the sealing part. Thus, the positive locking between the fixation part and the sealing part may be preferably formed by abutment of the longitudinal end face of the head portion facing the sealing part against a longitudinal end face of the first securing means directing to the front side of the fixation part.

Further preferably, the fixation part provides adjacently to the first securing means, abutment faces defining in circumferential direction a receiving portion for the head portion and/or the neck portion of the hammer-head shaped second securing means, wherein the hammer-head and/or the neck is adapted to fit into the receiving portion in circumferential direction. Particularly, the opening defined by the first securing means in circumferential direction preferably forms the receiving portion into which the neck is adapted to fit. The neck has a circumferential width equal or smaller than the circumferential width of the opening, wherein circumferential end faces of the neck will abut against circumferential end faces, which defines the opening, in the received state of the neck and at least when a rotational force is applied to the sealing part. Due to said preferred configuration, the sealing part may be secured to the fixation part in circumferential direction by means of positive locking. Alternatively or in addition thereto, the first securing means are formed in longitudinal direction of the fixation part at a position being spaced from the front surface side of the fixation part by a predetermined distance, wherein a section provided between said front surface side and the first securing means forms an additional receiving portion for the head of the second securing means. Preferably, the first securing means are formed in a center plane of the fixation part with respect to its longitudinal extension. Moreover, the hammer-head of the second securing means has preferably a circumferential width equal or smaller than a circumferential width of the additional receiving portion into which the hammer-head is fittable. Thereby, the second securing means may abut against the fixation part in circumferential direction with circumferential end faces of the neck and/or of the hammer-head, further improving the positive locking in circumferential direction.

In a further preferred embodiment, at least the fixation part and the ring part or the sealing part and the ring part provide opposing twist preventing means adapted to co-operate with each other so as to prevent a twist therebetween. A further circumferential securing between the respective parts can be obtained, which further improves the securing of the sealing part against the fixation part.

Further preferable, one of the fixation part and the ring part comprises at least one longitudinal protrusion projecting in longitudinal direction and the other one thereof comprises at least one notch for receiving the at least one protrusion so as to provide therebetween a positive locking in circumferential direction. Further, the ring part comprises at least one circumferential projection protruding radially from a circumference of the ring part, and the sealing part provides at least one receptacle for receiving the at least one circumferential projection so as to provide therebetween a positive locking in circumferential direction. Accordingly, the securing of the sealing part in radial and circumferential direction against the fixation part is further improved by means of the ring part connected on the one hand to the sealing part and further to the fixation part.

In a further preferred embodiment, the sealing part provides a breakage zone extending in longitudinal direction of the sealing part. The breakage zone is preferably formed of an incision extending further preferable over the entire longitudinal length of the sealing part. The incision denotes a weakening line for the material of the sealing part by which the sealing part can be broken with less force to release the sealing part from the cable. More preferably, the sealing part has a cavity in an area intersecting with the breakage zone to provide a working point for an auxiliary means such as e.g. a lever to break open the sealing part with less effort.

According to a further preferred embodiment, the sealing part provides at a rear end a polygonal shaped end portion, wherein said polygonal shaped end portion comprises two parallel outer surfaces accessible from an outer side. Preferably, the polygonal shaped end portion is cross-sectionally U-shaped with at two least parallel flat outer surfaces which provide working surfaces for supporting the securing of the sealing part against a mounting in a mounted state of the cable sealing device thereto. For instance, clamping elements may be preferably attached to said working surfaces from a radial outer side to secure the cable sealing device in longitudinal direction against the mounting. Furthermore, said working surfaces may preferably provide a bolt portion for co-operating with a tool kit attachable on said working surfaces so as to support securing of the cable sealing device to the mounting.

According to a further aspect of the present invention, a cable termination is provided which comprises a cable secured to an attaching part providing accessible outer positive locking faces extending in circumferential and longitudinal direction of the cable, and a cable sealing device having a preferred configuration as described above. The cable termination provides a unit which can be simply assembled to a mounting such as a cable sealing and retaining device and which can be also simply released therefrom. Further, in case of damage of one or more parts, only the defective parts need to be replaced.

In a further aspect of the present invention, an attaching device is provided which comprises an attaching part securable to a cable and providing outer positive locking faces extending in circumferential and longitudinal direction of the cable. The attaching device comprises a fixation part providing inner circumferential and axial abutment faces adapted to co-operate with the outer positive locking faces so as to provide therebetween a positive locking in circumferential and longitudinal direction, wherein the fixation part provides positive locking means on an outer circumference and/or on a longitudinal end section freely accessible from a radial outer side. The attaching device provides simple means for securing preferably a cable to a mounting which does not necessarily require a sealing between the mounting and the cable. Furthermore, the attaching device can be combined with the above-described cable sealing device in case the cable, to which the cable sealing device shall be mounted, does not be provided with a respective attaching part. Accordingly, by means of the attaching device, any cable not provided with an attaching part providing accessible outer positive locking faces can be secured directly to a cable sealing and/or retaining device.

In a preferred embodiment, the fixation part is C-shaped to be radially mountable on the attaching part. Thereby, a degree of freedom for handling the cable to which the attaching device is securable can be increased. Particularly, the cable can already be provided with a connector after securing the attaching part to the cable and, in addition, the connectorized cable can be connected to another connectorized cable before the fixation part is attached. Hence, the fixation part may be installed at any stage later on, for instance when the cable is to be attached to a mounting, either in a connected state or disconnected state. Furthermore, additional advantages as described above with respect to a C-shaped fixation part of the cable sealing device may be achievable.

According to a further preferred embodiment, the attaching device comprises a sealing part which provides a passageway with an inner seal through which the cable is sealingly guidable and an outer seal arranged on an outer circumference of the sealing part. Moreover, the fixation part has first securing means for co-operating with second securing means provided with the sealing part to secure the sealing part in circumferential and/or longitudinal direction against the fixation part. According thereto, the cable can be sealingly secured to the mounting in case of need, wherein the sealing part denoting a separate part can be simply mounted on the cable and secured to the fixation part. Furthermore, due to the securing of the sealing against the fixation part, a displacement therebetween and also between the sealing part and the cable can be prevented, whereby a sealing performance is improved.

In further preferred embodiments, the fixation part, the attaching part and the sealing part of the attaching device may adopt any possible preferred shape as further described herein.

BRIEF DESCRIPTION OF THE DRAWINGS

The present invention will now be described in further detail by referring to preferred embodiments depicted in the accompanying drawings. In these drawings:

FIGS. 1A-1D show a perspective side view of a cable sealing device according to one embodiment in a disassembled and an assembled state;

FIGS. 5A-5E show a perspective side view of a cable sealing and retaining device according to a further embodiment in a disassembled and assembled state with two cable sealing devices;

FIG. 6 shows a cross-sectional view of the housing shown in FIG. 5E;

FIGS. 7A-7C show a perspective side view of a fixation part of a cable sealing device provided with the cable sealing and retaining device shown in FIGS. 5A-5E, in a pre-installed manner on a cable without and with a sealing part accommodating a ring part;

DETAILED DESCRIPTION

Figure 1A:
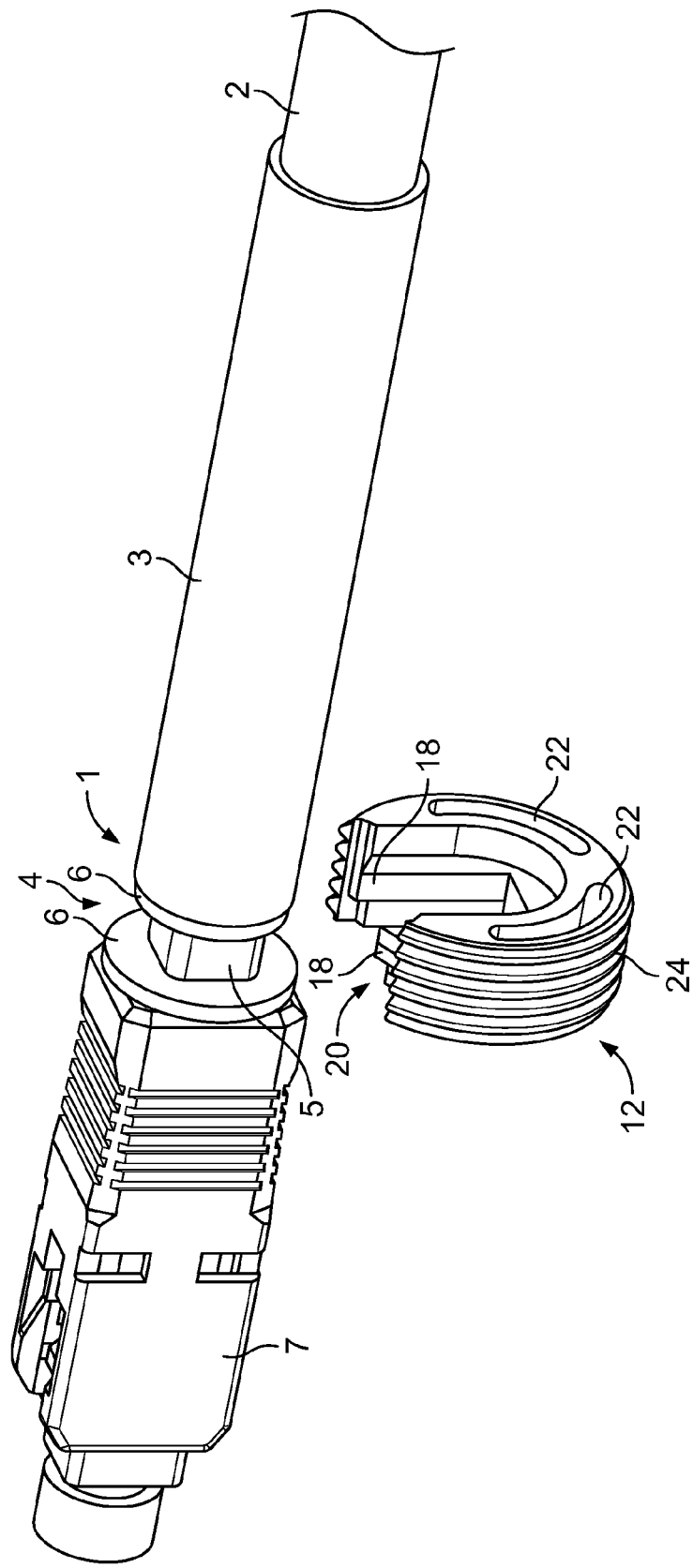

FIGS. 1A to 1D show a perspective side view of a connectorized cable 1 to which the cable sealing device 10 according to an embodiment is attached. Particularly, Fig. 1A shows the connectorized cable 1 which comprises a cable 2 fixed to a connector 7 by an attaching part 4. The connection of the cable 2 to the connector 7 via the attachment member or attaching part 4 is performed as known e.g. from WO 2007/039585 A1. Accordingly, the attaching part 4 made of a metal component comprises a connection portion (not shown) on which strain relief elements (not shown) provided with the cable 2 are attached and secured by means of a metal crimp (not shown). A heat shrink tube 3 is provided on the metal crimp and the cable 2 to seal the connection therebetween. The attaching portion 4 comprises outside the cable 2 two ring-shaped flanges 6, each providing surfaces directing in longitudinal direction, wherein the inner surfaces sandwich outer circumferential flat surfaces 5 formed by a polygonal shaped body (here a square) and connected to each other in circumferential direction by tapered edges. The surfaces of the flanges 6 and the outer circumferential flat surfaces 5 form positive locking faces. The heat shrink tube 3 ends at one surface side of the flange 6 arranged in longitudinal direction of the cable 2 between the body 5 and the connection portion of the attaching part 4. In this context, an axial direction corresponds to the longitudinal direction of the cable 2, and a radial direction refers to a direction running transverse thereto. A circumferential direction relates to a direction running around the longitudinal direction. The flange 6 provided between the heat shrink tube 3 and the outer circumferential flat surface 5 is disc-shaped and has an outer diameter equal or smaller than an outer diameter of the heat shrink tube 3, thereby providing an abutment surface for the axial end side of the heat shrink tube 3. The cable 2 abuts in axial direction against the connection portion on which the strain relief elements are attached. The opposing flange 6 has a diameter equal or smaller than a diameter of the connector 7 being an SC connector and providing an abutment surface for an axial end side, i.e. a rear side of said connector 7 in axial direction of the connectorized cable 1.

As shown in FIG. 1A, a threaded member or fixation part 12 forming part of the cable sealing device 10 is adapted to be attachable to the flanges 6 sandwiching the positive locking faces 5. The fixation part 12 is formed of a C-shape and comprises at its outer circumference, an external thread 24. The inner circumference of the fixation part 12 is substantially C-shaped and is divided in its axial direction into three sections. An outer circumference of the axial outer sections adopt a shape of an outer circumference of the flanges 6, respectively. Particularly, each outer section has a ring-segment-shaped bottom formed by a radius corresponding to a radius of the associated flange 6 and is adapted to receive the respective flange 6. From the circumferential ends of said ring-segment-shaped bottom, extend each a straight surface ending at the windings forming the external thread 24. Moreover, the middle section sandwiched by the outer sections is basically U-shaped and adopts the surface profile of the positive locking face 5. The middle section has a width in axial direction of the fixation part 12 corresponding to an axial length of the positive locking face 5 sandwiched by the flanges 6. Particularly, the legs forming the U-shape of the middle section protrudes from the inner circumference of the fixation part 12 such, that the axial end surfaces of the middle section form abutments surfaces for the axial surfaces of the flanges 6 facing the positive locking face 5. Hence, by mounting the fixation part 12 on the attaching part 4, the fixation part 12 is retained in axial direction of the attaching part 4. Additionally, the legs of the middle section extending from the bottom toward the opening 20 form each at their radial outer surface sides a step portion 18 providing thereby first securing means. The first securing means 18 are embedded in the opening 20. Particularly, the end faces of the legs directing to a radial outer side of the fixation part 12 and accommodating the first securing means 18 are arranged at a radial inner side of the fixation part 12 as a bottom of the windings which forms the external thread 24.

Figure 1B:
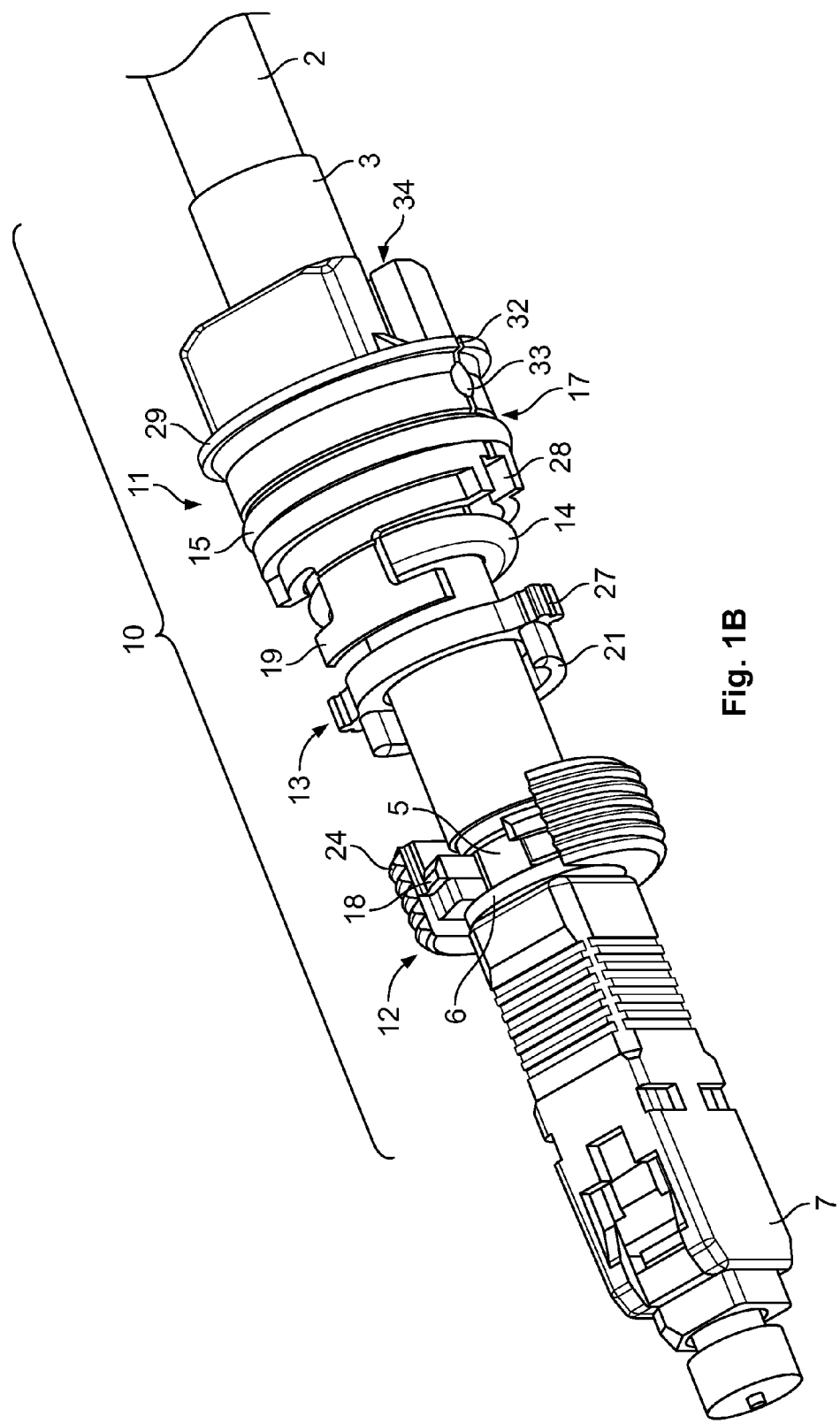

FIG. 1B shows the cable sealing device 10 mounted in its disassembled state on the connectorized cable 1. The cable sealing device 10 comprises the fixation part 12, a second member or sealing part 11 and a ring part 13 provided between the fixation part 12 and an inner seal ring 14. The ring part 13 has longitudinal protrusions 21 projecting from an axial end surface directing to the fixation part 12 to be received in 35 associated notches 22 formed on an axial end surface side of the fixation part 12 directing to the ring part 13, respectively (see FIG. 1A). The ring part 13 further comprises two circumferential projections 27 protruding radially from an outer circumferential surface of the ring part 13 in opposing directions toward an outside. Said circumferential projections 27 cooperate with receptacles 28 provided at respective positions in an axial end surface at a front side of the sealing part 11. The receptacles 28 are shaped correspondingly to the circumferential projections 27 to fully receive the circumferential projections 5 27 in the assembled state of the cable sealing device 10 and to provide a locking between the fixation part 12 and the ring part 13 in circumferential direction. The circumferential projections 27 provide on its radial surface crush ribs for compensating manufacturing tolerances. The receptacles 28 are opened towards a radial outer direction to expose the crush ribs of the rectangular protrusions in the assembled state.

FIGS. 1B to 1D show the sealing part 11 which is formed substantially of a sleeve having a cylindrical shape at one longitudinal end side relating to the front side, and a rectangular shape at the opposed longitudinal side, referring to a rear side of the sealing part 11, wherein the front side portion merges with the rear side portion at a flange portion 29. The flange portion 29 has an outer diameter larger than an outer diameter of the front side portion providing an outer support portion 17 of the sealing part 11. Said outer support portion 17 has a circumferential groove receiving an outer seal ring 15. The outer seal ring 15 slightly protrudes radially from the outer circumferential surface of the outer support portion 17 in its received state in order to come into contact with a sealing section 42; 52; 62 of a cable sealing and retaining device 40; 50; 60 as described further below. The front side portion of the sealing part 11 comprises the receptacles 28 for receiving the circumferential projections 27 of the ring part 13. At the front side between the receptacles 28, second securing means 19 protrudes axially in front side direction, i.e. away from the flange portion 29 and the rear side.

The second securing means 19 is hammer head shaped, wherein the hammer head projects in circumferential direction the opening 20 defined by the first securing means 18. The hammer head has a circumferential width corresponding to a circumferential opening width defined in circumferential direction by the end faces of the external thread 24. As particularly shown in FIG. 1D, the axial length of the second securing means 19 corresponds to an axial length of the fixation part 12. In the assembled state of the cable sealing device 10, the hammer head is fitted in the circumferential opening defined by the external thread 24. Further, an axial end surface of the second securing means 19 forms with an axial end surface of the fixation part 12, a common surface. On a radial inner side of the second securing means 19, which is the side directing to the axis of the cable sealing device 10, ratchets are provided which engage the step-shaped first securing means 18 of the fixation part 12 in the assembled state of the cable sealing device 10. Thereby, the sealing part 11 is secured to the fixation part 12 in axial direction. Further, as the second securing means 19 is fitted in the assembled state of the cable sealing device 10 in the circumferential opening defined by the external thread 24, circumferential end faces of the second securing means 19 abut against circumferential end surfaces of the external thread 24, whereby the securing of the sealing part 11 in circumferential direction is further improved. Additionally, the first securing means 18 (FIG. 1C) and the second securing means 19 comprise sliding surfaces formed by tapered edges provided at the sides of the step-formed first securing means 18 facing the second securing means 19 and at the ratchets of the second securing means 19 facing the first securing means 18, respectively. Moreover, the second securing means 19 has a circumferential extending incision 30 provided at the transition from the outer support section 17 to the second securing means 19 by which the second securing means 19 is improved to be elastically pivotable about incision 30 in radial direction of the sealing part 11. By connection of the sealing part 11 to the fixation part 12, the second securing means 19 slides with its tapered edges over the tapered edges of the first securing means 18, wherein the ratchets of the second securing means 19 engage behind the radial extending surface of the step-formed first securing means 18 in the assembled state of the cable sealing device 10 to axially fix the sealing part 11 to the fixation part 12. The second securing means 19 has a further tapered section formed on the radial inner side at a longitudinal free end side, whereby the longitudinal free end side provides a handleable tip end 31 to allow manually disassembling of the sealing part 11 from the fixation part 12 by lifting the tip end 31 in radial outside direction and, thereby, releasing the second securing means 19 from the first securing means 18.

The sealing part 11 has a breakage zone formed by an incision 32 extending on the circumferential outer surface of the sealing part 11 in longitudinal direction. The sealing part 11 provides a cavity 33, which intersects the breakage zone 32 in the area of the outer support portion 17. The breakage zone 32 has such a depth that the sealing part 11 can be released from the connectorized cable 1 by breaking the sealing part 11 along the breakage zone 32. The breakage may be conducted e.g. by means of a lever insertable into the cavity 33. As shown in FIGS. 1B to 2A, the breakage zone 32 extends axially over the whole longitudinal length of the sealing part 11. That is, the breakage zone 32 extends from the flange portion 29 towards the front side until the receptacles 28, and from the flange portion 29 towards the rear side of the sealing part 11 which is basically U-shaped and forming securing formations 35 on an outer circumference with a gap 34 provided in elongation of the breakage zone 32.

Figure 2A:
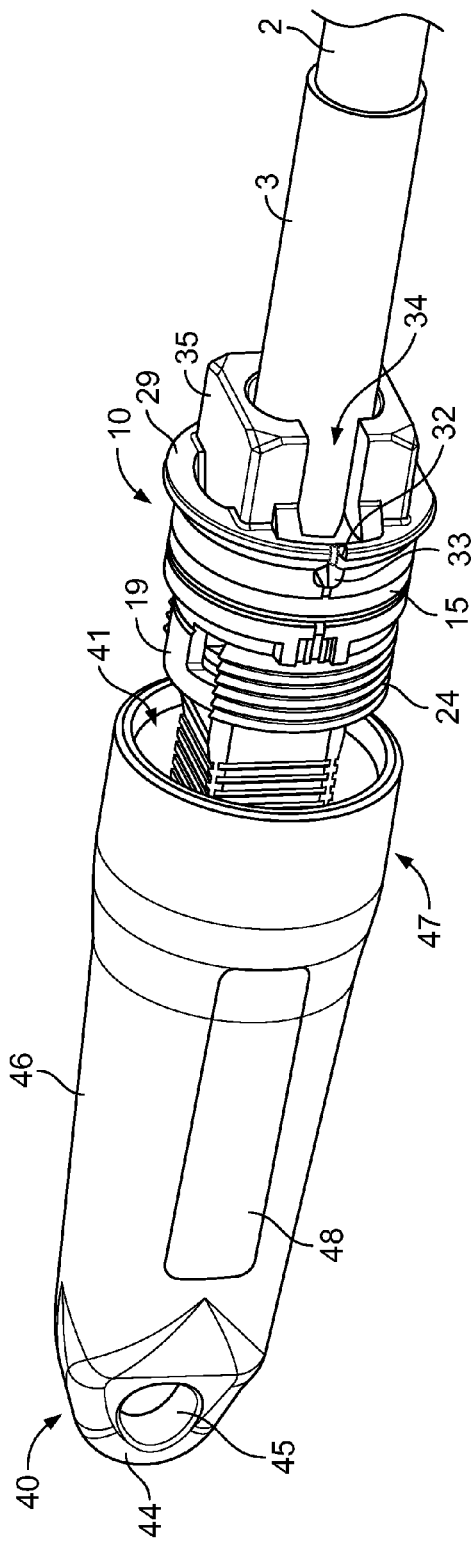
FIGS. 2A and 2B show a perspective side view of a cable sealing and retaining device according to one embodiment in a disassembled and assembled state with the cable sealing device as shown in FIG. 1D.
Figure 2B:
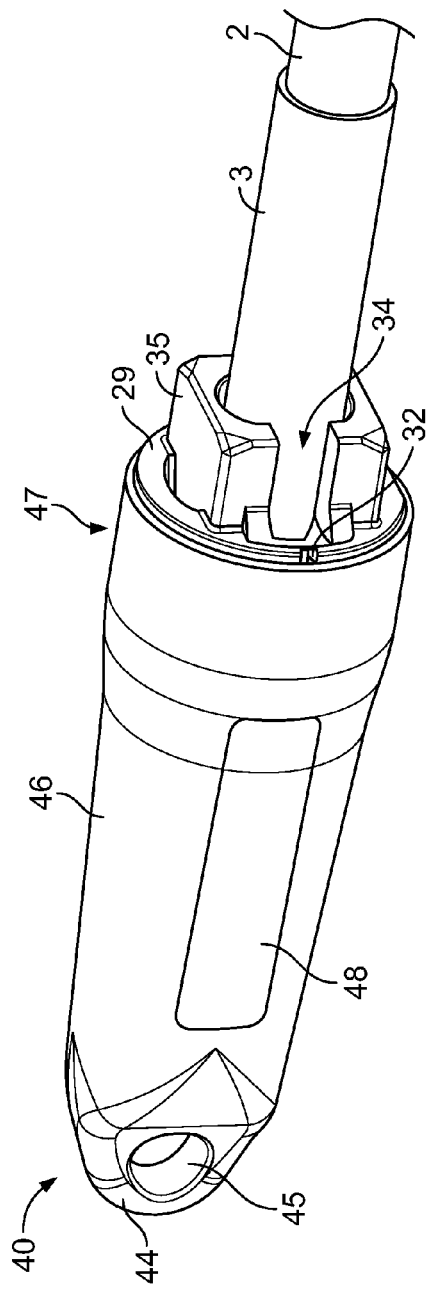
Figure 3:
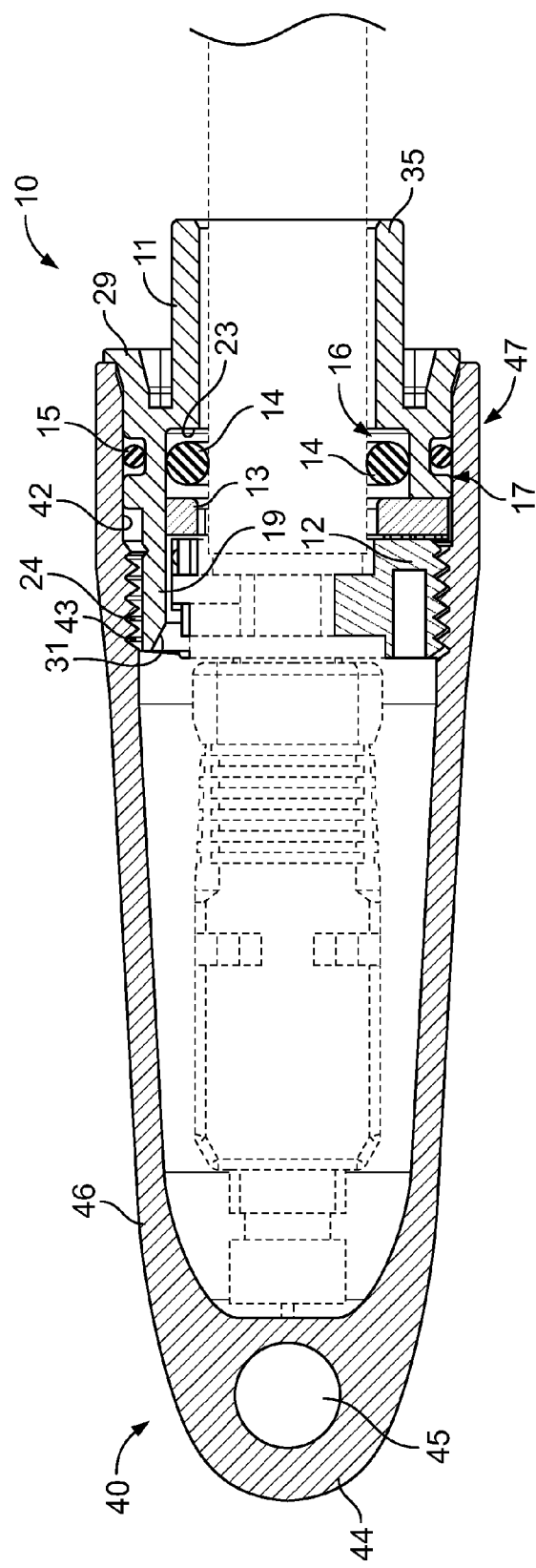
FIG. 3 shows a cross-sectional view of the cable sealing and retaining device with the cable sealing device as shown in FIG. 2B.
Figure 4A:
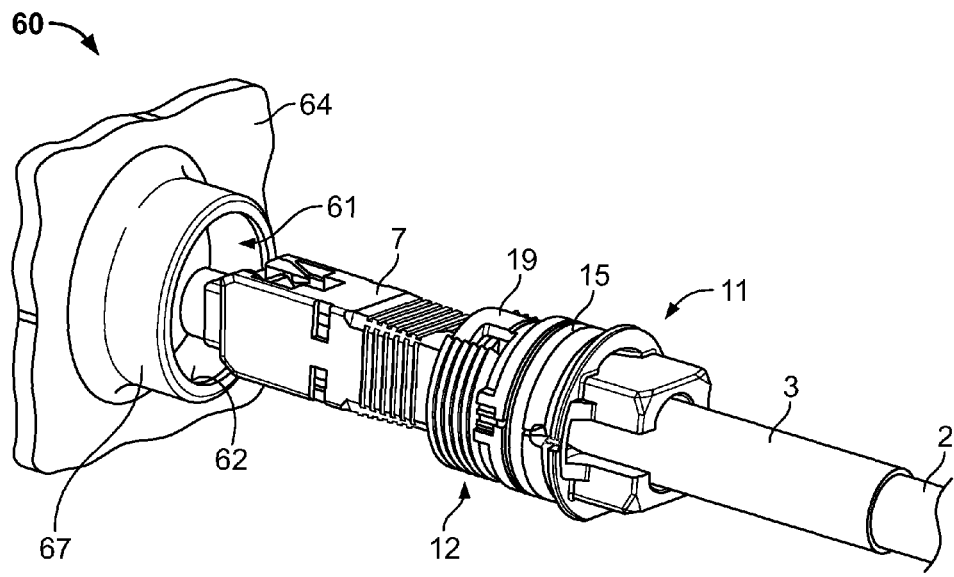
FIGS. 4A-4D show a perspective side view of a cable sealing and retaining device according to another embodiment in a disassembled and assembled state with the cable sealing device as shown in FIG. 1D.
Figure 4B:
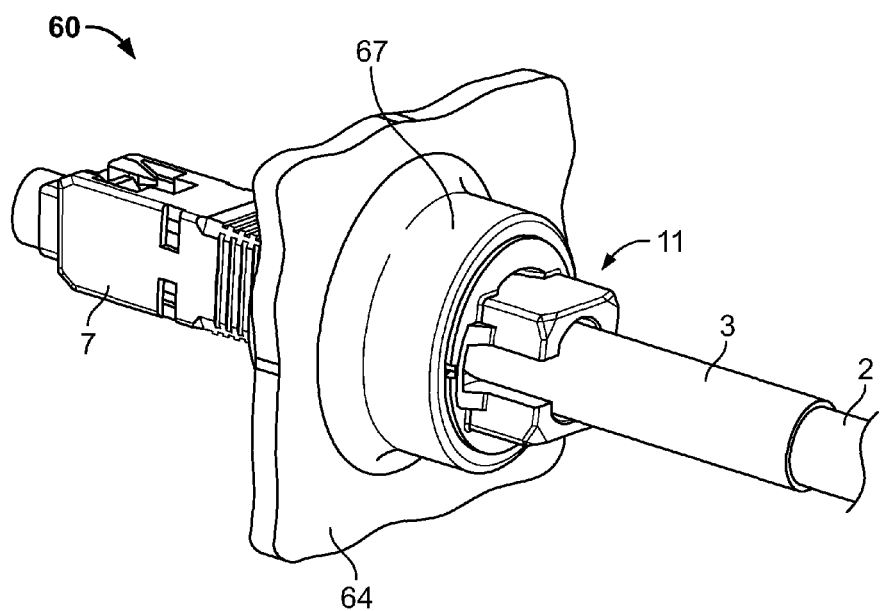
Figure 4C:
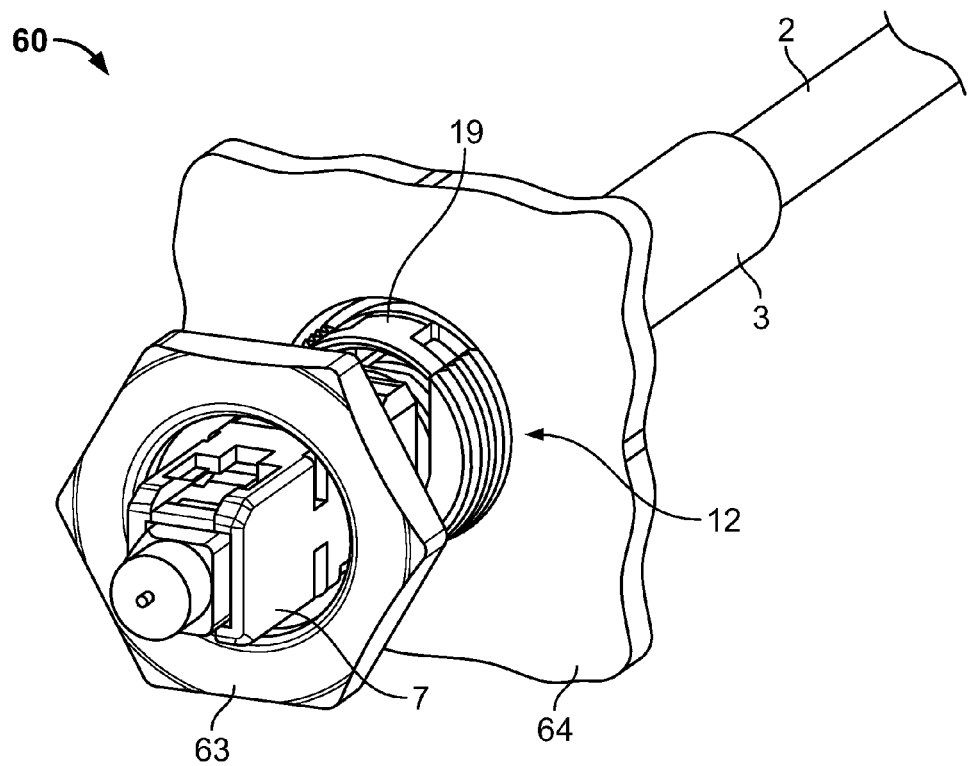
Figure 4D:
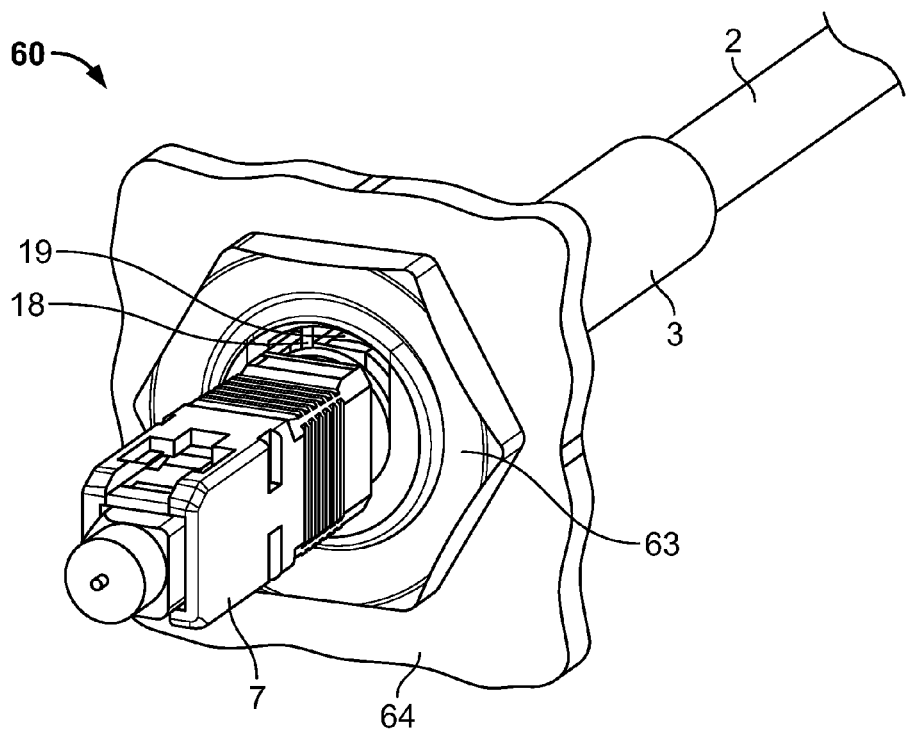

FIGS. 2A and 2B show a perspective side view of a cable sealing and retaining device 40 according to an embodiment in its disassembled and assembled state with the cable sealing device 10. FIG. 3 shows a cross-sectional view in longitudinal direction of said cable sealing and retaining device 40 connected to the cable sealing device 10.

The cable sealing and retaining device constitutes a pulling cap 40 formed by injection moulding plastic material and providing an opening 41 at one longitudinal end side, which denotes the rear side and a pulling attachment member 44 at its opposed longitudinal end side, which constitutes the front side. The pulling attachment member 44 is provided at the front side of the housing 46 and forms a round-shaped tip end for the pulling cap 40, wherein a pulling eye formed of a through-hole 45 is provided transverse to the longitudinal direction of the pulling cap 40. Said pulling attachment member 44 with its pulling eye 45 is provided for being attachable to a pulling device to pull the pulling cap 40 through a duct.

The pulling cap 40 provides a housing 46 of a cylindrical shaped single body. The housing 46 is further conical shaped in longitudinal direction of a sleeve portion 47 provided at a rear end side of the housing 46 and forming the opening 41 having the largest diameter. The housing 46 has flat surface portions 48 on its outer circumference at opposing sides. The flat surface portions 48 of a rectangular shape extend in longitudinal direction by a predetermined length and in circumferential direction by a predetermined width. The flat surface portions 48 provide working surfaces engageable for instance with engaging surfaces of a tool kit like a screw-wrench for supporting fixation of the pulling cap 40 with the cable sealing device 10. The housing 46 has a longitudinal length capable of accommodating inside of the housing 46 in an accommodating section 49 the connector 7 and the parts of the cable sealing device 10 ranging from the fixation part 12 to the flange portion 29. Particularly, the longitudinal free end surface of the sleeve portion 47 surrounding the opening 41 provides an abutment surface for the flange portion 29 in longitudinal direction such that the longitudinal surface of the flange portion 29 abuts against the abutment surface of the sleeve portion 47 in the assembled state of the pulling cap 40 with the cable sealing device 10, whereby the securing formations 35 at the rear side of the cable sealing device 10 extend from the rear end side of the pulling cap 40 in longitudinal direction. Accordingly, the securing formations 35 can be also used for supporting the fixation of the pulling cap 40 with the cable sealing device 10 by means of a screw-wrench as described above. The sleeve portion 47 provides a sealing section 42 arranged adjacent to the opening 41 to be sealingly contacted in the assembled state by the outer seal 15 as shown in FIG. 3. Further inside of the housing 46 adjacent to the sealing section 42, the housing 46 comprises an internal thread 43 cooperating with the external thread 24 of the fixation part 12. Particularly, the cable sealing device 10 is screwable into the pulling cap 40 by engagement of the internal thread 43 and the external thread 24.

Alternatively to the thread engagement, a bayonet mount (not shown) may be provided, wherein a male pin and a female slot may be appropriately positioned at the fixation part 12 and the sleeve portion 47, respectively. Exemplary, the internal and external threads 43, 24 may be replaced with the pin and the slot, respectively, wherein one of the fixation part 12 and the sleeve portion 47 provide the pin and the other one the slot. The insertion depth of the cable sealing device 10 is defined by the abutment of the flange portion 29 with the abutment surface of the sleeve portion 47 surrounding the opening 41 and/or, for instance, by the number of windings provided with the internal and/or external thread 43, 24, respectively, whereby a predetermined longitudinal length of said threads 43, 24 is defined.

With reference to FIG. 3, a configuration of the inner sealing portion 16 of the sealing part 11 according to this embodiment will now be described. The sealing part 11 provides a passageway through which the cable 2 covered by the heat shrink tube 3 is guided. The passageway is substantially divided into a front section and a rear section. The rear section extends from the rear side of the sealing part 11 towards the front side until a step provided at a position radially below the outer support portion 17 is reached, wherein said rear section has an inner diameter slightly larger than an outer diameter of the heat shrink tube 3 to allow guiding of the cable 2 with the heat shrink tube 3 provided at the end thereof through said passageway. The front section arranged in longitudinal direction adjacently to the rear section extends from the rear section to the front side of the sealing part 11, i.e. from the step to a transverse plane containing the circumferential incision 30 provided at the transition between the outer support portion 17 and the longitudinal end of the neck of the hammer-head shaped second securing means 19. The front section forms the inner support section 16. Said inner support section 16 has an inner diameter larger than an inner diameter of the rear section. The step provided between the rear and front sections forms a cavity 23 opened to the front side, i.e. to the side facing the fixation part 12, and to the passageway to accommodate the inner seal ring 14. The inner seal ring 14 is mounted on the heat shrink tube 3 which forms part of the cable 2. Due to the connection portion of the attaching part 4 extending below the inner seal ring 14, said inner seal ring 14 is further supported by the attaching portion 4. Moreover, the inner seal ring 14 has an outer diameter larger than an inner diameter of the cavity 23. Hence, the inner seal ring 14 applies a pressing force in radial directions in a received state in the cavity 23, i.e. toward the passageway and toward the sealing part 11. Due to the dimension of the inner seal ring 14 with respect to the cavity 23, the sealing part 11 is further securable on the cable 2 by the pressure applied by the inner seal ring 14 in its received state. Moreover, tolerances between the inner seal ring 14 and the cable 2 may be compensated to obtain a reliable sealing therebetween.

In the assembled state of the cable sealing device 10, by which the fixation part 12 and the sealing part 11 are secured to each other, the ring part 13 forms an abutment for the inner seal ring 14 at its front end to prevent a flowing of the inner seal ring 14 material, being a material suited for obtaining sealing performance such as rubber, gel, mastic and the like, out of the cavity 23.

A connection of the cable sealing device 10 with the connectorized cable 1 can be achieved as follows. At first, the sealing part 11 with the inner seal ring 14 and the ring part 13 are mounted on the cable 2 not provided with the attaching part 4. Then, the axial end of the cable 2 is connected to the attaching part 4 by a common connection method using a crimp means and a heat shrink tube 3. Subsequent thereto, the fixation part 12 is mounted on the positive locking faces 5, 6 of the attaching part 4. Particularly, the fixation part 12 is secured to the positive locking faces 5, 6 from a radial outer side. The fixation part 12 is thereby retained in circumferential direction and in longitudinal direction. The ring part 13 is then moved in longitudinal direction towards the fixation part 12 and secured thereto by inserting the longitudinal protrusions 21 into the notches 22. Thus, the ring part 13 is secured against the fixation part 12 in circumferential direction. Thereafter, the sealing part 11 is secured to the fixation part 12 by moving the sealing part 11 in longitudinal direction, i.e. in its axial direction towards the fixation part 12 and connecting the second securing means 19 to the first securing means 18. The sealing part 11 is retained by the fixation part 12 in longitudinal direction by means of positive locking formed between the first and second securing means 18, 19 in longitudinal direction and in circumferential direction by means of positive locking formed between the circumferential end surfaces of the fixation part 12 and the second securing means 19. Furthermore, the longitudinal protrusions 21 of the ring part 13 are received by the notches 22 of the sealing part 11, whereby a positive locking in circumferential direction is achieved between the sealing part 11 and the ring part 13. Accordingly, the sealing part 11 is secured in circumferential direction by the positive locking formed between the longitudinal protrusions 21 and the notches 22 and further by the first and second securing means 18, 19, wherein the fixation part 12 is fixed on the attaching part 4 in circumferential and in longitudinal directions. Hence, the cable sealing device 10 is secured against the attaching part 4 in circumferential direction and in longitudinal direction in its assembled state. Moreover, the inner seal ring 14 is retained in the cavity 23 of the sealing part 11 in longitudinal direction toward the fixation part 12 by the ring part 13. At last, in case of need, the connector 7 is connected to the attaching part 4. However, the connector 7 does not necessarily need to be mounted on the attaching part 4. The connector 7 may be mounted on the attaching part 4 at any stage after fixing the attaching part 4 to the cable 2.

The cable sealing device 10 is removable from the connectorized cable 1 in a reversed order. Thereby, the sealing part 11 may be removed from the connectorized cable 1 by breaking the breakage zone 32 and by bending the opened sealing part 11 so as to be removable from the cable 2. Thereby, the connection of the connectorized cable 1 formed between the connector 7, the attaching part 4 and the cable 2 does not need to be necessarily opened.

FIGS. 4A to 4D show a perspective side view of a cable sealing and retaining device 60 according to another embodiment in a disassembled and assembled state with the cable sealing device 10. The cable sealing and retaining device 60 forms a wall mounting 64 formed integrally with a sleeve portion 67 extending perpendicular from a front side surface of the wall mounting 64. The sleeve portion 67 provides a through-hole extending through the wall mounting 64 and forms at one longitudinal end side an opening 61 which receives the cable sealing device 10. The sleeve portion 67 has a length in longitudinal direction corresponding to a longitudinal length of the outer support portion 17 supporting the outer seal 15. Further, the sleeve portion 67 merges at a rear side of the wall mounting 64, which is the side opposing the side from which the sleeve portion 67 extends, with said rear side surface of the wall mounting 64 so as to form a common rear surface.

In an assembled state of the cable sealing and retaining device 60 with the cable sealing device 10, the fixation part 12 projects with the fixation means 24 from the rear side of the wall mounting 64 to be accessible from said rear side. The cable sealing and retaining device 60 further comprises a fastener or polygonal-shaped lock nut 63 which is screwed on the fixation part 12 from the rear side of the wall mounting 64. Thereby the cable sealing device 10 is fixed to the cable sealing and retaining device 60. Particularly, the securing formations 35 projects from the sleeve portion 67 in longitudinal direction thereof at the front side of the wall mounting 64. The securing formations 35 provide two parallel extending outer flat surfaces which can be used as a bolt portion. Accordingly, the fixation of the cable sealing device 10 to the cable sealing and retaining device 60 may be conducted and, thereby, further improved by screwing the lock nut 63 onto the fixation part 12, while holding the securing formations 35 of the sealing part 11, i.e. the cable sealing device 10, by means of a screw-wrench.

Figure 7C:
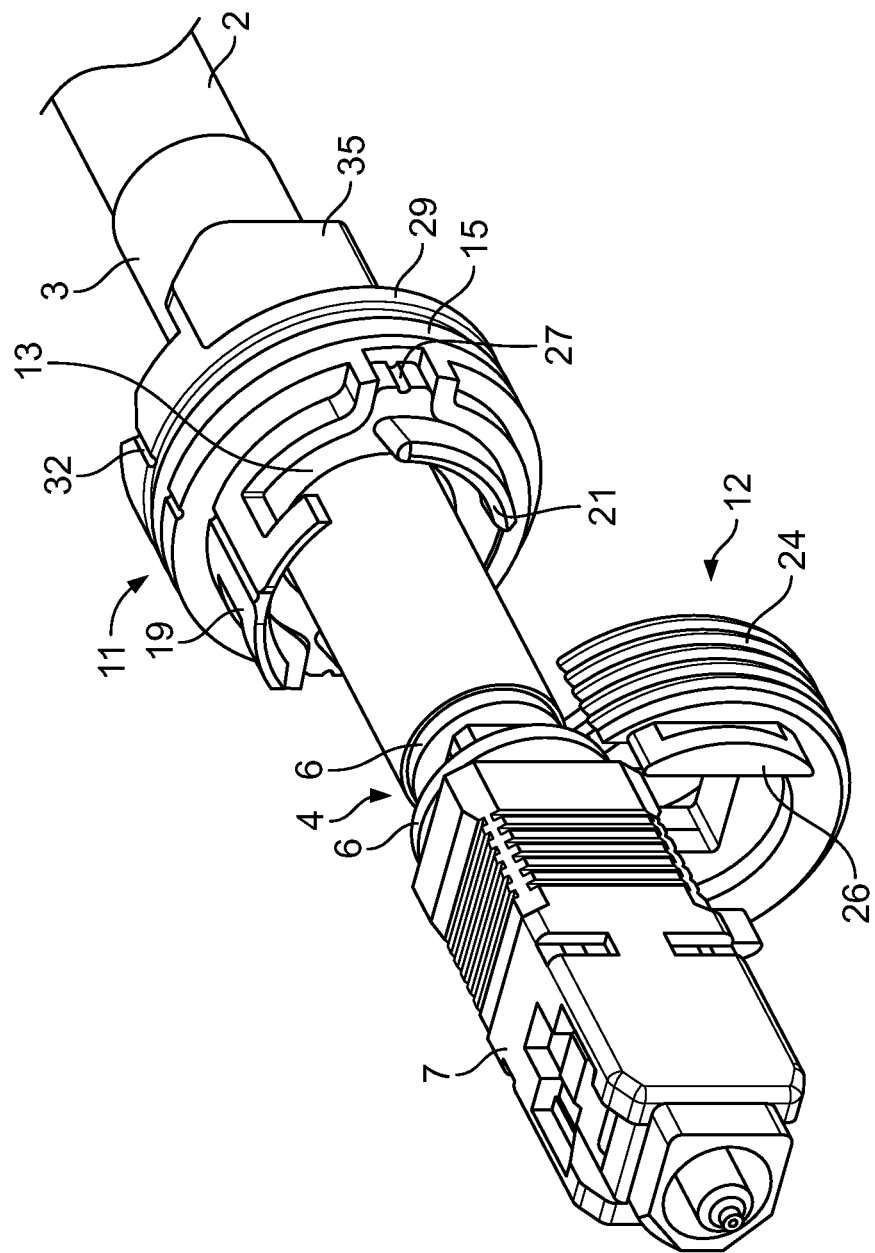

FIGS. 5A to 5E show a perspective side view of a cable sealing and retaining device 50 according to a further embodiment. FIG. 6 shows a cross-sectional view of the cable sealing and retaining device 50. FIGS. 7A to 7C show a perspective side view of the fixation part 12 of the cable sealing device 10 provided with the cable sealing and retaining device 50 in a pre-installed manner on the cable 2 without and with the sealing part 12 receiving the ring part 13. The cable sealing device shown in FIGS. 7A to 7C differs substantially from the cable sealing device 10 shown in FIGS. 1A to 1D by a specific configuration of the fixation part 12 and an outer shape of the sealing part 11. Accordingly, the specific shape of the fixation part 12 and of the sealing part 11 dealt with in the following description of the cable sealing and retaining device 50 is to be regarded in combination with the description made in view of FIGS. 1A to 1D, wherein similar or corresponding parts providing an equivalent function are identified with similar reference signs.

The cable sealing and retaining device 50 comprises a sleeve-shaped housing 53 having two openings 51 at its longitudinal end sides, wherein the housing 53 is adapted to accommodate two cable sealing devices 10, which are each mounted on a connectorized cable 1, and wherein the connectors 7 of the connectorized cables 1 are connected to each other via an adapter 70 inside the housing 53. The connectors 7 are formed of male connectors, wherein the adapter 70 provides female connectors at its longitudinal end sides receiving the male connectors 7, respectively. As shown in FIG. 7C, the cable sealing device 10 has a flange portion 29 with an outer diameter corresponding to an outer diameter of the outer support portion 17 provided for receiving the outer seal ring 15. The cable sealing device 10 may be alternatively combined with the cable sealing device 10 having the flange portion 29 with a larger outer diameter than the outer support portion 17 (see FIG. 1D).

The cable sealing and retaining device 50 further comprises a tension support part 56 formed of a half shell and adapted to receive the connection formed between the connectors 7 and the adapter 70. Particularly, the tension support part 56 comprises three sections, two longitudinal end support sections for receiving the connector part exposed between a longitudinal end side of the cable sealing device 10 and an opposed longitudinal end side of the adapter 70. Between said two longitudinal end support sections, the tension support part 56 comprises a middle section provided for supporting the adapter 70. As particularly shown in FIG. 6, the longitudinal end support sections support the exposed part of the connector 7 and the adapter 70, wherein the support sections, supporting the exposed part of the connector 7, merge towards the middle section by a step portion, thereby providing longitudinal abutment surfaces for the part of the adapter 70 protruding radially from an outer circumferential surface of the connector 7 to an outside thereof.

Figure 5A:
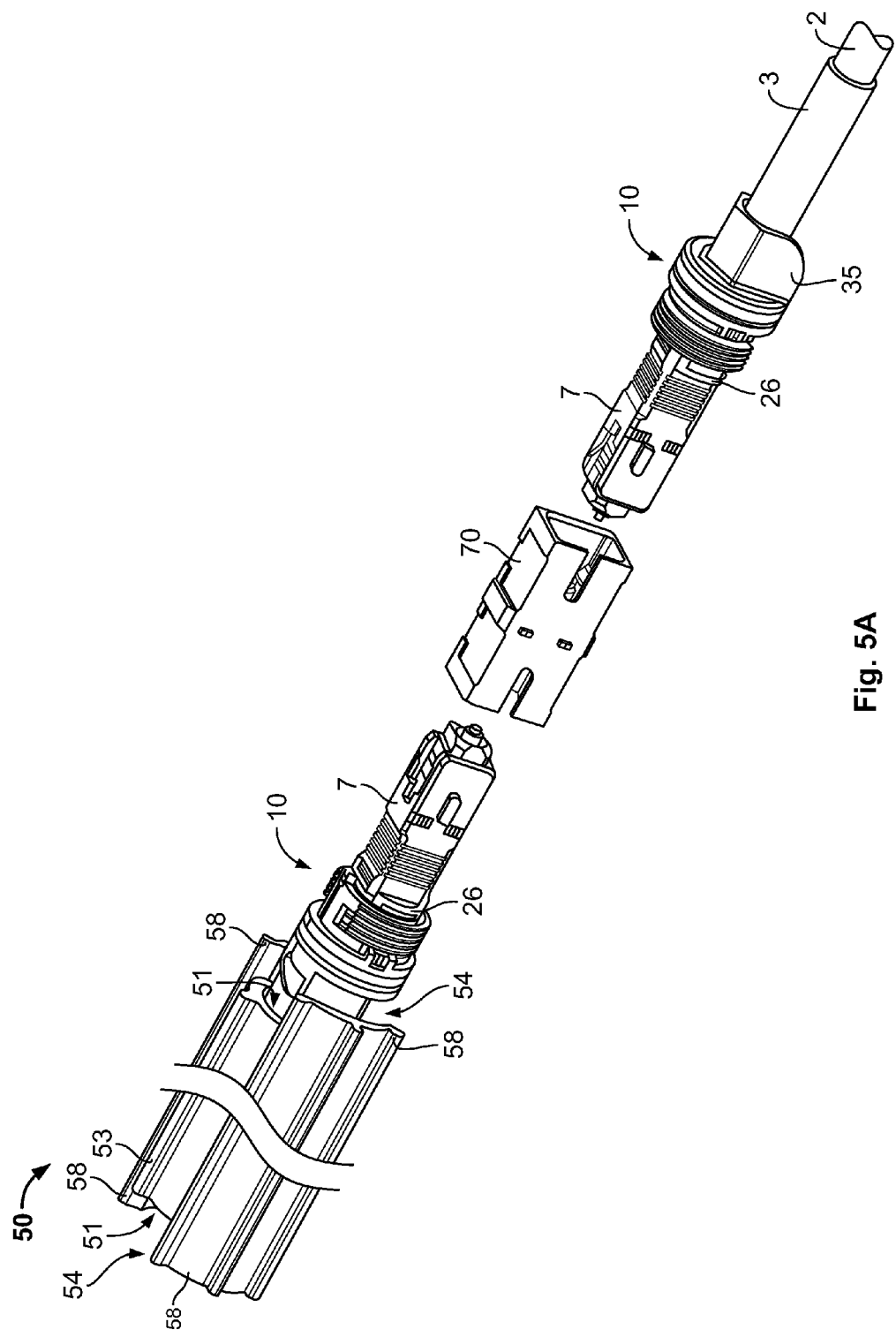
Figure 5B:
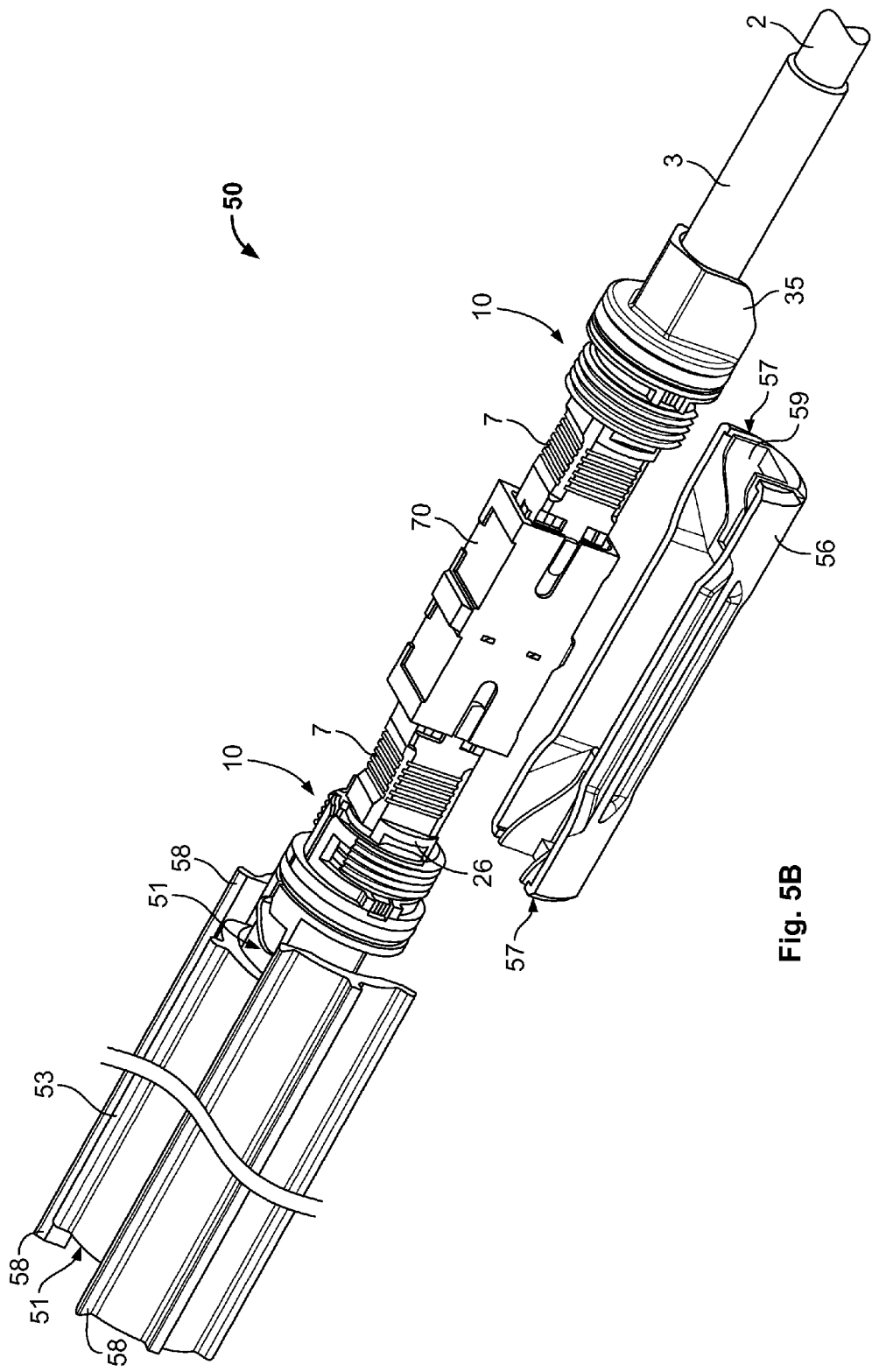
Figure 5C:
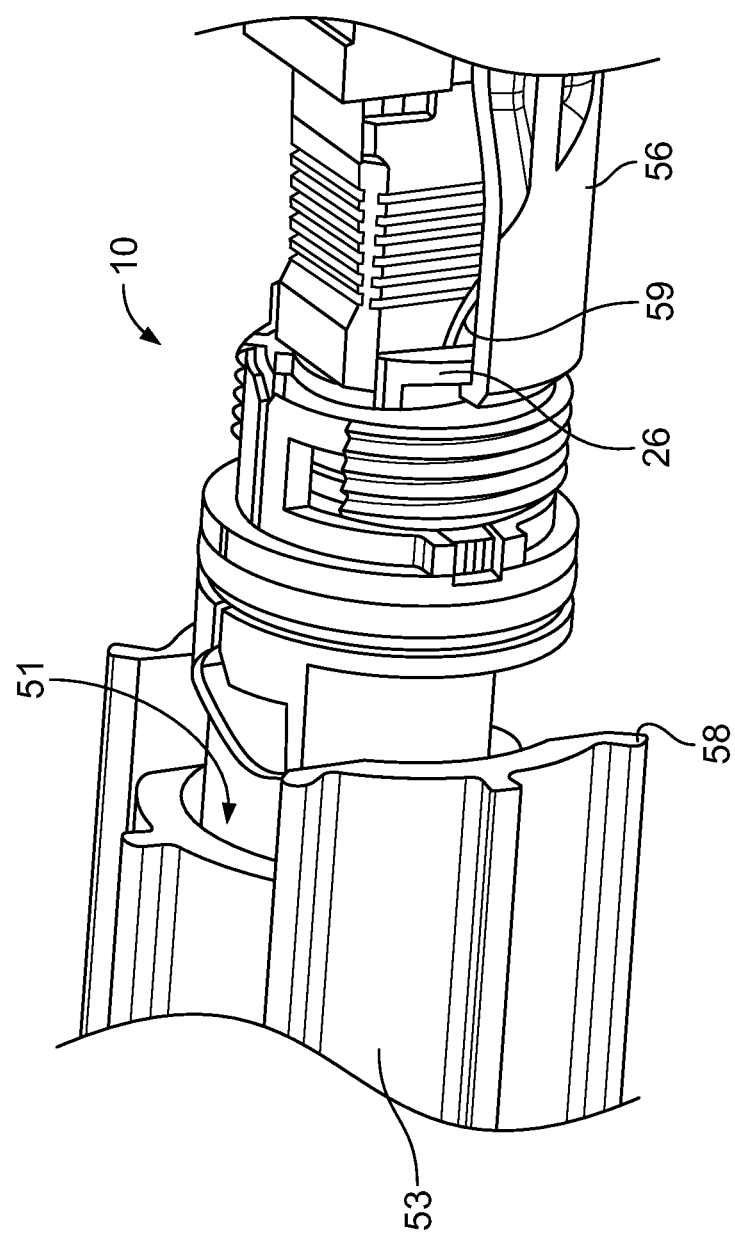
Figure 5D:
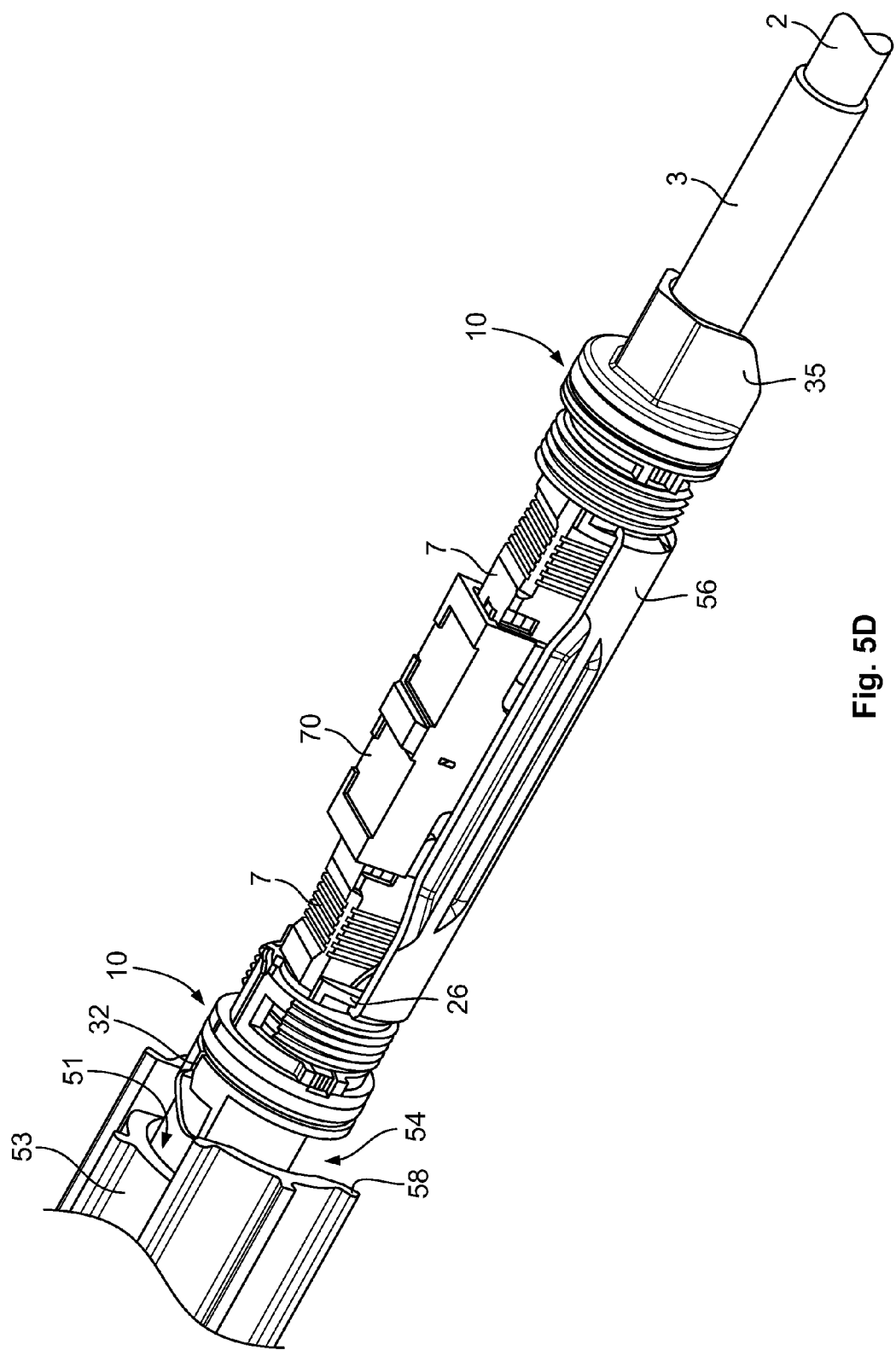

FIG. 5C shows an exploded perspective side view of the cable sealing device 10 connected to the tension support part 56. Particularly and as further shown in FIGS. 7A to 7C, the fixation part 12 has at its longitudinal free end side a protrusion 26 providing a slot extending in a straight direction transverse to the longitudinal direction and which engages an associated key 57 formed by a radial inward projecting flange provided at the longitudinal free end side of the tension support part 56. In this context, instead of the fixation part 12, the attaching part 4, even though not shown in the Figures, may be provided with said protrusion 26 at its longitudinal end surface side directing away from the fixation part 12. In this case, the protrusion 26 may be formed in an area accessible from an outer side and being exposed between a side surface of the connector 7 and the longitudinal end surface of the fixation part 12. Accordingly, the following description of the protrusion 26, the formation thereof at the fixation part 12 and the way of connection to the tension support part 56 may also be transferable, respectively, to a configuration in which the attaching part 4 provides the protrusion 26. Particularly, the fixation part 12 is connected to the tension support part 56 by a key-and-slot configuration providing a positive locking in longitudinal direction of the tension support part 56. Moreover, the tension support part 56 has a support wall 59 arranged on a radial inner side of the tension support part 56 and forming a gap with the key-forming flange for receiving a longitudinal free end section of the protrusion 26. Said longitudinal free end section forms also a flange projecting radially outward of the fixation part 12. In an assembled state of the tension support part 56 with the protrusion 26, the support wall 59 is inserted in a space formed at a radial inner side of the protrusion 26, i.e. in a space formed between the radial inner side of the protrusion 26 and a radial outer side of the connector 7. Thereby, the protrusion 26 is supported in radial direction. In case, the attaching part 4 has the protrusion 26, the tension support part 56 may be formed without the support wall 59.

Due to the provision of the tension support part 56, a tension force caused e.g. by a pulling force acting on the cables 2 in longitudinal direction and normally transmitted to the connection formed by the connectors 7 and the adapter 70, can be bypassed via the fixation part 12 (attaching part 4) to the tension support part 56 from one cable sealing device 10 side to the other one without affecting the connection formed therebetween. In other words, the tension force acting on the cables in longitudinal direction will not be further transmitted to the connection formed between the fixation parts 12 (attaching parts 4). Thus, the pulling force will bypass the connection and the same is reliably retained by means of the tension support part 56 secured at its longitudinal end sides to the fixation parts 12 (attaching parts 4). Moreover, a twist between the cable sealing devices 10, i.e. a turning moment on the connection formed between the connectors 7 is also prevented, since a circumferential move of one cable sealing device 10 will cause always a circumferential move of the other cable sealing device 10 without transmitting the turning moment to the connection between the fixation parts 12 (attaching parts 4) due to the connection of the tension support part 56 to the fixation parts 12 (attaching parts 4), respectively.

FIG. 5E shows in particular the housing 53 which has at each longitudinal end side, two elongations 58 forming wall projections extending in parallel from the opening 51 in longitudinal direction and forming a recess portion 54 therebetween, which run transverse to the longitudinal direction of the housing 53. The housing 53 has a longitudinal length sufficient to accommodate the cable sealing devices 10 and the connection formed therebetween, wherein the securing formations 35 of the sealing part 11 project the opening 51 in longitudinal direction of the housing 53 between the recess portion 54. The recess portion 54 receives a clip element 55. The clip element 55 is substantially U-shaped and is moved over the securing formation 35 of the cable sealing device 10 to be clamped thereon. The clip element 55 has at longitudinal free end sides of its legs, engaging pawls for engaging behind end sides of the securing formation 35 to radially fix the clip element 55 to the securing formations 35. Since each recess portion 54 receives a clip element 55, the cable sealing and retaining device 50 and the cable sealing devices 10 are secured to each other in longitudinal and in circumferential direction thereof.

An assembling of the cable sealing and retaining device 50 to the cable sealing devices 10 may be performed as follows, for instance. After mounting the cable sealing devices 10 on the connectorized cables 1 in a manner as described above, the housing 53 is moved over one cable sealing and retaining device 10. Then, the connectors 7 are connected to the adapter 70. Thereafter, the tension support part 56 is secured to the protrusion 26 by the key-and-slot configuration as described above. Subsequent thereto, the housing 53 is moved over the connection formed between the cable sealing devices 10 until both outer seals 15 contact the sealing sections 52 of the housing 53, respectively. Then, the clip elements 55 are fixed to the securing formations 35 of the cable sealing devices 10 from a radial outer side to secure the housing 53 extending over both cable sealing devices 10. Thereby, the connection formed between the cable sealing devices 10 is accommodated inside the housing 53 and sealed by the cable sealing devices 10 inserted into the longitudinal end sides of the housing 53. Further, due to the clip elements 55, the housing 53 is secured in longitudinal and in circumferential direction to the cable sealing devices 10.

The cable sealing and retaining device 50 can be disassembled by removing the clip elements 55 and moving the housing 53 from the cable sealing devices 10. The cable sealing devices 10 can be removed from the connectorized cables 1 by releasing the sealing part 11 from the fixation part 12, removing radially the fixation part 12 from the attaching part 4 and breaking the breakage zone 32 of the sealing part 11 to radially remove said sealing part 11 from the connectorized cable 1.

Figure 8:
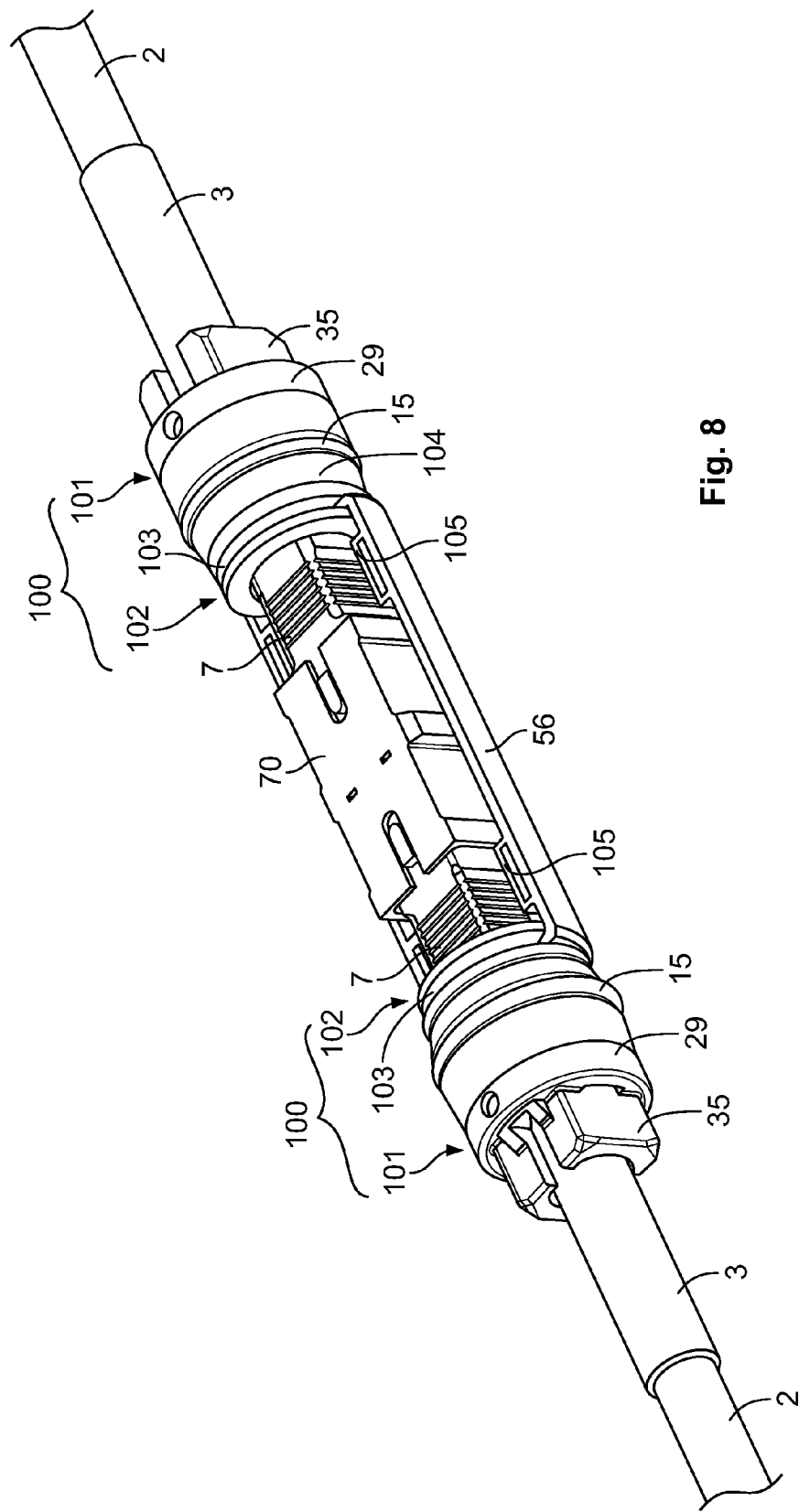
FIG. 8 shows a perspective side view of a cable connection between two cable sealing devices according to a further embodiment usable for a cable sealing and retaining device as shown in FIGS. 5A to 5E.

FIG. 8 shows a perspective side view of a cable connection between two cable sealing devices 100 according to a further embodiment usable for the cable sealing and retaining device 50 as described above. The cable sealing device 100 differs substantially from the above-described cable sealing device 10 by an outer shape of the fixation part 102 and of the sealing part 101. Accordingly, only said specific outer shape will be dealt with in the following, wherein further shapes of the fixation part 102 and of the sealing part 101 relate to shapes of the fixation part 12 and the sealing part 11 described above along with the cable sealing device 10, wherein similar reference signs refer to similar parts and portions, respectively. The fixation part 102 provides an interstice 103 extending in circumferential direction for receiving the key-forming flange of the tension support part 56 from a radial outer side to form the key-and-slot-connection between the tension support part 56 and the fixation part 102. Particularly, the interstice 103 provides at its longitudinal end sides an abutment for the longitudinal surfaces of the key-forming flange of the tension support part 56. Thereby, the positive locking in longitudinal direction between the fixation part 102 and the tension support 56 is achieved. Even though the fixation part 102 is shown of a ring shape, the fixation part 102 can adopt any shape suitable for providing the interstice 103. Accordingly, the fixation part 102 may be formed of a C-shaped and connected to the sealing part 102 as described above. Furthermore, the fixation part 102 may be formed of two parts mounted on the attaching part from a radial outer side and connected to each other by latching means, for instance. The sealing part 101 provides an outer shape adapted to the outer shape of the fixation part 102 in order to allow securing therebetween at least in one longitudinal direction side, for instance, by abutment. As shown in FIG. 8, the sealing part 101 has a conical portion 104 between the fixation part 102 and the outer seal 15, wherein an outer diameter of the conical portion 104 decreases in longitudinal direction from the outer support portion of the sealing part 101, which supports the outer seal 15, until the fixation part 102 is reached. According thereto, the sealing part 101 provides a continuous crossing between an outer surface of the fixation part 102 and an outer surface of the outer support portion supporting the outer seal 15. Thus, the housing 53 can be moved in longitudinal direction over the fixation part 102 and the sealing part 101 until the outer seal 15 contacts the sealing section 52 provided inside the housing 53 without getting stuck.

As further shown in FIG. 8, the half-shell shaped tension support part 56 provides abutment portions 105 for abutting against outer sides of the connector 7 in the mounted state of the tension support part 56. The abutment portions 105 projects an inner surface of the tension support part 56 towards the connector 7 side, i.e. towards the longitudinal axis of the tension support part 56. The tension support part 56 provides the abutment portions 105 at opposing sides of each connector 7 received by the tension support part 56. Accordingly, the tension support part 56 abuts in circumferential direction against each side of the connector 7, which is covered by the tension support part 56. In other words, the tension support part 56 is adapted to receive the connector 7 in a fitted manner. Additionally, the abutment portion 105 provides abutment surfaces in longitudinal direction to further improve a positive locking in said direction.

Figure 9:
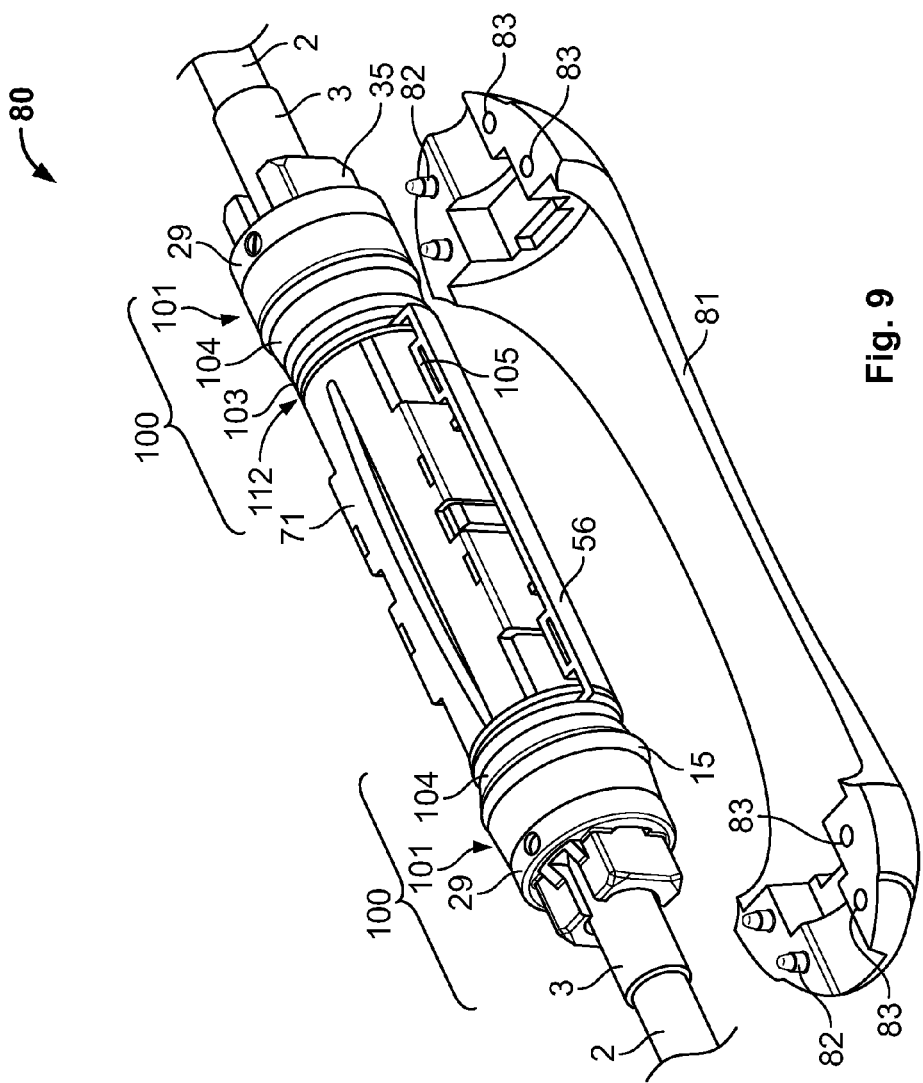
FIG. 9 shows a perspective side view of a cable sealing and retaining device according to a further embodiment in a disassembled with two cable sealing devices according to a further embodiment connected to each other.

FIG. 9 shows a perspective side view of a cable sealing and retaining device 80 according to a further embodiment provided with two cable sealing devices 100. Same reference signs relate to corresponding portions and parts described above. The cable sealing and retaining device 80 comprises two cable sealing devices 100, each comprising a fixation part 112 which differs from the above-described fixation part 102 by omission of the interstice 103. the interstice 103 is formed between longitudinal end sides of an adapter 71 which extends between the fixation parts 112 of the cable sealing devices 100 and a corresponding longitudinal end side of the fixation part 112. Particularly, the cable connection provided between the longitudinal end sides of the cable sealing devices 100 and radially supported by the tension support part 56 is covered by the adapter 71 having a longitudinal length smaller than a longitudinal distance formed between facing longitudinal end sides of the fixation parts 102. The adapter 71 provides a longitudinal length corresponding to a longitudinal distance between opposing inside surfaces of the key-forming flanges provided with the tension support part 56. Accordingly, the adapter 71 fits into the tension support part 56 between the key-forming flanges formed at longitudinal end sides of the tension support part 56. As the tension support part 56 has a longitudinal length corresponding to a longitudinal distance formed between facing longitudinal end sides of the fixation part 112, the interstice 103 with a longitudinal width adapted to receive the key-forming flange from the radial outer side is formed between the longitudinal end side of the adapter 71 and the facing longitudinal end side of the respective fixation part 112.

The cable sealing and retaining device 80 comprises a housing formed by identical shaped housing halves 81 connectable to the cable sealing devices 100 form a radial outer side. Each housing half 81 provides at its longitudinal end sides support sections for radially supporting the heat shrink tube 3 and the rear end side of the sealing part 101 providing the securing formations 35. Thus, the support sections has an inner surface profile matching an outer surface profile of the heat shrink tube 3 and of the rear end portion of the sealing part 101 comprising the securing formations 35. The housing halves 81 are connected to each other by a pin-hole-connection provided at the longitudinal end sides adjacent to the support sections. Particularly, each longitudinal end side of the housing half 81 provides pins 82 and pin-receiving holes 83 adjacent to the support sections in a radial outward direction with respect to the longitudinal axis of the housing half 81. The pins 82 have an outer shape adapted to press-fit into associated pin-receiving holes 83 to secure the two housing halves 81 against each other.

Figure 10:
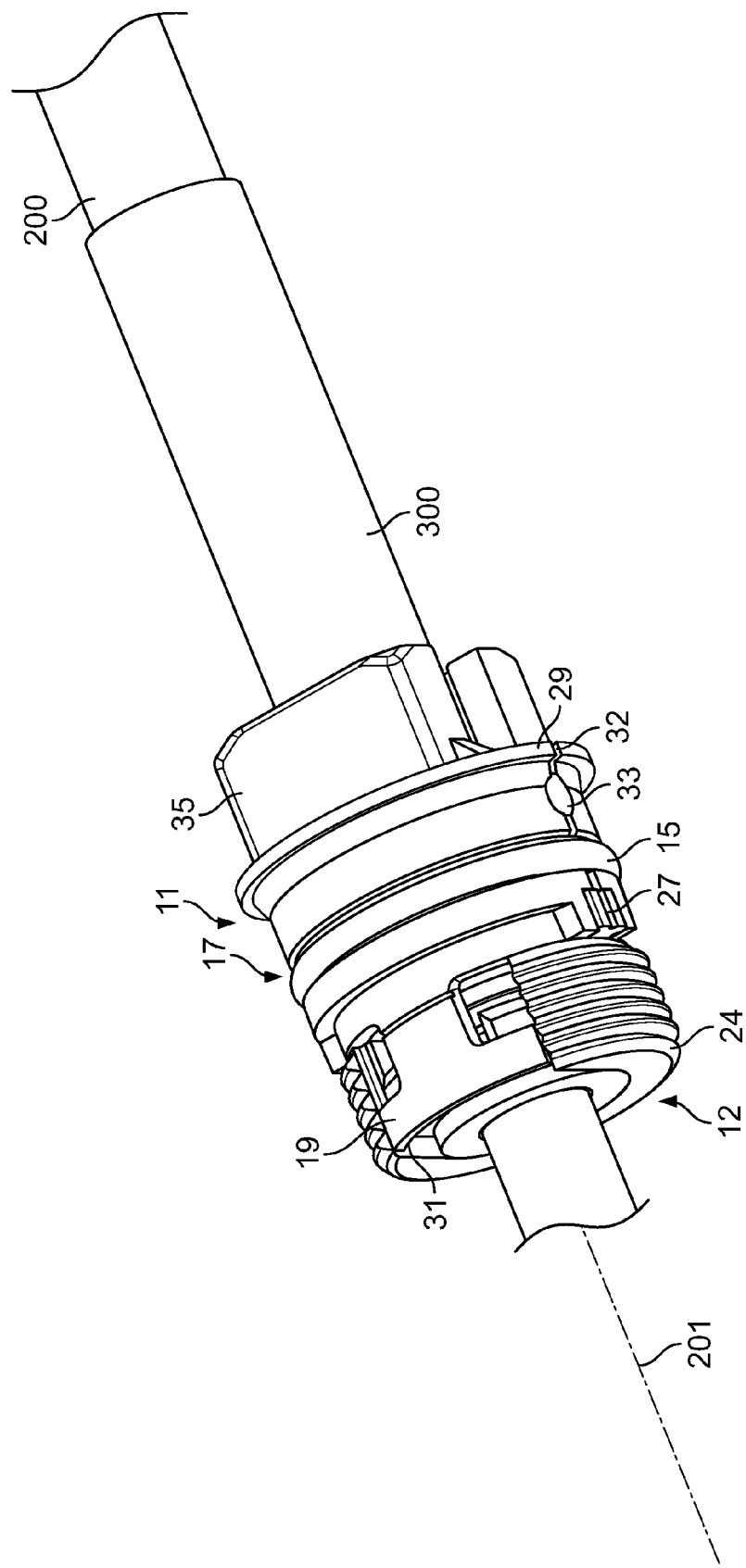
FIG. 10 shows a perspective side view of a cable sealing device according to another embodiment in an assembled state.

FIG. 10 shows a further embodiment of a connection of the cable sealing device 10 to a cable 200. Same reference signs refer to similar parts as described above. The cable sealing device 10 is particularly mounted on the cable 200 guiding a signal transmitting element 201 and joint to a connection portion of the attaching part at least by means of a heat shrink tube 300, wherein the cable 200 does not be provided with a connector at a longitudinal free end side portion projecting from the fixation part 12. The longitudinal free end side portion of the attaching part provides a connection end 202 by which the cable 200 may be further operated. However, the present invention is not to be construed as to be limited thereto. The attaching part may be generally provided with or without such a connection end and/or with or without the protrusion 26 as described above. Accordingly, the attaching part differs from the attaching part shown particularly in FIGS. 1A to 1D by omission of the connector. Hence, the connector does not form a necessary part for mounting the cable sealing device 10 on the cable 2. The cable sealing device 10 may be mountable on any kind of cables in order to retain and/or seal the cable guidable therethrough.

In view of the above, the present invention has been described with reference to specific preferred embodiments. However, a combination of one or more parts as described along with one preferred embodiment with one or more parts as described along with another described preferred embodiment is also feasible.

Reference List 1 connectorized cable
2, 200 cable
3, 300 heat shrink tube
4 attaching part
5, 6 positive locking face
7 connector
10, 100 cable sealing device
11, 101 sealing part
12, 102, 112 fixation part
13 ring part
14 inner seal ring
15 outer seal ring
16 inner support portion
17 outer support portion
19 first securing means
19 second securing means
20 opening
21 longitudinal protrusion
22 notch
23, 33 cavity
24 external thread
26 protrusion
27 ring part
28 receptacle
29 flange portion
30 circumferential incision
31 tip end
32 breakage zone
34 gap
35 securing formations
40, 50, 60, 80 cable sealing and retaining device
41, 51, 61 opening
42, 52, 62 sealing section
43 internal thread engagement
44 pulling attachment member
45 through hole
46, 53 housing
47, 67 sleeve portion 48 flat surface portion
49 accommodating section
54 recess portion
55 clip element
56 tension support part
57 slot
58 elongation
59 support wall
63 lock nut
64 wall mounting
70, 71 adapter
81 housing half
82 pin
83 pin-receiving hole
103 interstice
104 conical portion
105 abutment portion
201 signal transmitting element
202 connection end

The invention claimed is:

1. A connector arrangement for connectorizing a first end of a cable, the connector arrangement comprising:
   a connector terminating the first end, the connector extending axially from a front to a rear;
   a threaded member carried with the cable at the rear of the connector, the threaded member being axially and rotationally fixed relative to the connector, wherein the threaded member is configured to slide laterally over the cable;
   a second member disposed around the cable rearwardly of the threaded member, the second member having a largest cross-dimension that is larger than a largest cross-dimension of the threaded member; and
   a fastener that is configured to slide axially over the connector to thread onto the threaded member, thereby clamping a wall between the fastener and the second member when the connector is inserted through an aperture defined in the wall.

2. The connector arrangement of claim 1, wherein the second member carries a seal.

3. The connector arrangement of claim 2, wherein the seal faces inwardly to engage the cable.

4. The connector arrangement of claim 2, wherein the seal faces outwardly to engage a sleeve extending from the wall.

5. The connector arrangement of claim 4, wherein the second member also carries an inner seal that engages the cable.

6. The connector arrangement of claim 1, wherein the second member is axially fixed relative to the threaded member.

7. The connector arrangement of claim 1, wherein the second member is rotationally fixed relative to the threaded member.

8. The connector arrangement of claim 1, wherein the second member is axially and rotationally fixed relative to the threaded member.

9. The connector arrangement of claim 1, wherein the second member includes a forward axial extension configured to engage a portion of the threaded member.

10. The connector arrangement of claim 9, wherein the forward axial extension has a T-shape.

11. The connector arrangement of claim 9, wherein the forward axial extension extends across a full axial length of the threaded member when engaged to the portion of the threaded member.

12. The connector arrangement of claim 1, wherein the threaded member is slotted to define a C-shape.

13. The connector arrangement of claim 1, further comprising an attachment member mounted over the cable at the rear of the connector, wherein the threaded member mounts to the attachment member.

14. The connector arrangement of claim 13, wherein the attachment member defines positive locking faces that engage internal faces of the threaded member.

15. A connector arrangement for connectorizing a first end of a cable, the connector arrangement comprising:
   a connector terminating the first end, the connector extending axially from a front to a rear;
   an attachment member carried with the cable at a position rearward of the connector, the attachment member defining positive locking faces facing outwardly from the attachment member;
   a threaded member mounted to the attachment member so that the threaded member is axially and rotationally fixed relative to the attachment member; and
   a second member disposed around the cable rearwardly of the threaded member, the second member including a flange that extends outwardly farther than any portion of the threaded member and connector, the second member carrying an inner seal that faces the cable and an outer seal that faces outwardly from the second member.

16. The connector arrangement of claim 15, further comprising a fastener that is configured to slide axially over the connector to thread onto the threaded member.

17. The connector arrangement of claim 15, wherein the threaded member defines a radial slot such that the threaded member has a C-shape, the radial slot being sized to enable the cable to slide through the slot.

18. The connector arrangement of claim 15, wherein the second member is axially fixed to the threaded member.

19. The connector arrangement of claim 15, wherein the second member is rotationally fixed to the threaded member.

20. A connector arrangement for connectorizing a first end of a cable, the connector arrangement comprising:
   a connector terminating the first end, the connector extending axially from a front to a rear;
   a threaded member carried with the cable at the rear of the connector, the threaded member being axially and rotationally fixed relative to the connector;
   a second member disposed around the cable rearwardly of the threaded member, the second member having a largest cross-dimension that is larger than a largest cross-dimension of the threaded member, wherein the second member carries a seal that faces outwardly to engage a sleeve extending from the wall, and wherein the second member also carries an inner seal that engages that cable; and
   a fastener that is configured to slide axially over the connector to thread onto the threaded member, thereby clamping a wall between the fastener and the second member when the connector is inserted through an aperture defined in the wall.

21. A connector arrangement for connectorizing a first end of a cable, the connector arrangement comprising:
   a connector terminating the first end, the connector extending axially from a front to a rear;
   a threaded member carried with the cable at the rear of the connector, the threaded member being axially and rotationally fixed relative to the connector;
   a second member disposed around the cable rearwardly of the threaded member, the second member having a largest cross-dimension that is larger than a largest cross-dimension of the threaded member; and a fastener that is configured to slide axially over the connector to thread onto the threaded member, thereby clamping a wall between the fastener and the second member when the connector is inserted through an aperture defined in the wall;

wherein the second member includes a forward axial extension configured to engage a portion of the threaded member, wherein the forward axial extension has a T-shape.

22. A connector arrangement for connectorizing a first end of a cable, the connector arrangement comprising:

a connector terminating the first end, the connector extending axially from a front to a rear;

a threaded member carried with the cable at the rear of the connector, the threaded member being axially and rotationally fixed relative to the connector;

a second member disposed around the cable rearwardly of the threaded member, the second member having a largest cross-dimension that is larger than a largest cross-dimension of the threaded member, wherein the second member includes a forward axial extension configured to engage a portion of the threaded member, and wherein the forward axial extension extends across a full axial length of the threaded member when engaged to the portion of the threaded member; and a fastener that is configured to slide axially over the connector to thread onto the threaded member, thereby clamping a wall between the fastener and the second member when the connector is inserted through an aperture defined in the wall.

23. A connector arrangement for connectorizing a first end of a cable, the connector arrangement comprising:

a connector terminating the first end, the connector extending axially from a front to a rear;

a threaded member carried with the cable at the rear of the connector, the threaded member being axially and rotationally fixed relative to the connector, wherein the threaded member is slotted to define a C-shape;

a second member disposed around the cable rearwardly of the threaded member, the second member having a largest cross-dimension that is larger than a largest cross-dimension of the threaded member; and a fastener that is configured to slide axially over the connector to thread onto the threaded member, thereby clamping a wall between the fastener and the second member when the connector is inserted through an aperture defined in the wall.

24. A connector arrangement for connectorizing a first end of a cable, the connector arrangement comprising:

a connector terminating the first end, the connector extending axially from a front to a rear;

a threaded member carried with the cable at the rear of the connector, the threaded member being axially and rotationally fixed relative to the connector;

a second member disposed around the cable rearwardly of the threaded member, the second member having a largest cross-dimension that is larger than a largest cross-dimension of the threaded member;

a fastener that is configured to slide axially over the connector to thread onto the threaded member, thereby clamping a wall between the fastener and the second member when the connector is inserted through an aperture defined in the wall; and an attachment member mounted over the cable at the rear of the connector, wherein the threaded member mounts to the attachment member, wherein the attachment member defines positive locking faces that engage internal faces of the threaded member.

* * * * *